US012771796B2

(12) United States Patent
Narushima et al.

(10) Patent No.: US 12,771,796 B2
(45) Date of Patent: Oct. 20, 2026

(54) INFORMATION PROCESSING SYSTEM, NON-TRANSITORY COMPUTER-READABLE STORAGE MEDIUM, AND METHOD

(71) Applicant: FUJIFILM Business Innovation Corp., Tokyo (JP)

(72) Inventors: Kazuhiko Narushima, Kanagawa (JP); Masayoshi Miki, Kanagawa (JP); Koji Udagawa, Kanagawa (JP); Shun Ida, Kanagawa (JP); Masahito Shikata, Kanagawa (JP); Hidenori Horie, Kanagawa (JP); Yukio Kontani, Kanagawa (JP); Kazuya Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 41 days.

(21) Appl. No.: 18/799,618

(22) Filed: Aug. 9, 2024

(65) Prior Publication Data

US 2025/0310456 A1 Oct. 2, 2025

(30) Foreign Application Priority Data

Mar. 26, 2024 (JP) ................................ 2024-049198

(51) Int. Cl.
*H04N 1/00* (2006.01)
*G06F 21/32* (2013.01)

(52) U.S. Cl.
CPC ......... *H04N 1/00896* (2013.01); *G06F 21/32* (2013.01)

(58) Field of Classification Search
USPC .......................................................... 358/1.13
See application file for complete search history.

(56) References Cited

U.S. PATENT DOCUMENTS

2006/0123252 A1* 6/2006 Vaidya .................. G06F 1/3228 713/300

FOREIGN PATENT DOCUMENTS

JP 2023-142619 A 10/2023

* cited by examiner

*Primary Examiner* — Jacky X Zheng
(74) *Attorney, Agent, or Firm* — Sughrue Mion, PLLC

(57) ABSTRACT

An information processing system includes a processor for an apparatus having an executable mode and one or more types of power saving mode and setting a shift time from the executable mode to the power saving mode, the executable mode being a mode in which execution of a process is ready, the processor being configured to: detect change of a user who operates the apparatus; obtain an index value based on counts of execution of processes in the respective modes in the apparatus, and set the shift time based on the obtained index value; and, in the setting, count, as a single process, a plurality of processes in the count for the mode in which the first process of the plurality of processes is performed, the plurality of processes being performed continuously in a state in which the change is not detected.

15 Claims, 15 Drawing Sheets

FIG. 12

| JOB NUMBER | RETURN FROM SP BEFORE JOB (COUNT IN SP VALUE) | RETURN FROM LP BEFORE JOB (COUNT IN LP VALUE) | READY MODE BEFORE JOB | JOB DESCRIPTION | TIME INTERVAL AFTER COMPLETION OF JOB | CHANGE OF USER WITHIN THRESHOLD TIME AFTER COMPLETION OF JOB | COUNT IN R1 VALUE |
|---|---|---|---|---|---|---|---|
| NO1 | 1 | | | COPY | ZERO SECONDS | — | |
| NO2 | | | 1 | PRINT FROM SERVER | 15 SECONDS | NOT CHANGE (USER A) | |
| NO3 | | | 1 | COPY | 30 SECONDS | NOT CHANGE (USER A) | |
| NO4 | | | 1 | PRINT FROM SERVER | 20 SECONDS | NOT CHANGE (USER A) | |
| NO5 | | | 1 | SCAN | FIVE MINUTES | — (USER A) | 1 |
| NO6 | | | 1 | SCAN | 30 SECONDS | NOT CHANGE (USER A) | |
| NO7 | | | 1 | PRINT FROM SERVER | 50 SECONDS | CHANGE (USER B) | 1 |
| NO8 | | | 1 | COPY | 10 MINUTES | — (USER C) | 1 |
| NO9 | | | 1 | COPY | 30 SECONDS | NOT CHANGE (USER C) | |
| NO10 | | 1 | | PRINT FROM SERVER | ZERO SECONDS | — | |
| NO11 | | | 1 | PRINT FROM SERVER | 15 SECONDS | NOT CHANGE (USER D) | |
| NO12 | | | 1 | PRINT FROM SERVER | 40 SECONDS | CHANGE (USER E) | 1 |

INFORMATION PROCESSING SYSTEM, NON-TRANSITORY COMPUTER-READABLE STORAGE MEDIUM, AND METHOD

CROSS-REFERENCE TO RELATED APPLICATIONS

This application is based on and claims priority under 35 USC 119 from Japanese Patent Application No. 2024-049198 filed Mar. 26, 2024.

BACKGROUND

(i) Technical Field

The present disclosure relates to an information processing system, a non-transitory computer-readable storage medium, and a method.

(ii) Related Art

A known apparatus has power saving mode. A user, who is to use the apparatus in the power saving mode, needs to return the apparatus from the power saving mode to the mode in which execution of a process is ready. Since this return needs a certain amount of time, the user has to wait until the apparatus is ready for use. The waiting time of a user until the apparatus is ready for use is an index of the user convenience of the apparatus. If, for example, the power saving mode is not used or the apparatus is set so as not to frequently enter the power saving mode, the waiting time of a user is made short, but the power saving of the apparatus degrades.

The apparatus disclosed in Japanese Unexamined Patent Application Publication No. 2023-142619 has the standby mode, in which the apparatus is ready for execution of a process, and multiple power saving modes of different stages of power saving. This apparatus obtains the average return time from the count of execution of processes in each mode and the length of time of a return from each mode to the state in which execution of a process is ready. If the obtained average return time attains a target value, the apparatus decreases the set value of the shift time from the standby mode to the power saving mode, thereby causing a shift to the power saving mode to occur frequently. The apparatus's frequent shift to a power saving mode results in improvement of the power saving of the apparatus. With such a mechanism, this apparatus achieves a balance between user convenience and power saving of the apparatus.

SUMMARY

It is often the case that a user, who goes to an apparatus, causes the apparatus to perform multiple processes continuously. Among multiple continuous processes in response to an instruction from the same user, an issue about user convenience arises only in the first process. This is because a user may have to wait for the first process. Since the apparatus is in the executable mode at the times of the second and subsequent processes, the user does not have to wait, and basically does not feel the inconvenience caused by the waiting time.

In contrast, as in the related art, if each process is counted in the execution count for the mode in which the process is performed, all the second and subsequent processes, which are performed continuously, are counted as execution counts for the executable mode in which high convenience is experienced. This means that all the cases of no need of consideration about whether the convenience is high or low are counted as cases where the convenience is high. Therefore, unfortunately, the determined convenience is much higher than the way a user actually feels. If the convenience is too high, control is exerted so that the shift time to the power saving mode is shortened for slightly lower convenience and higher power saving. Therefore, when the determined convenience is higher than the actual one, the shift time to the power saving mode is unfortunately set less than an appropriate value which matches the actual user-side feeling. In this case, since the apparatus is often in the power saving mode, a user often has to wait long for a return from the power saving mode at the time of use of the apparatus.

Aspects of non-limiting embodiments of the present disclosure relate to a technique of more appropriately setting the shift time to the power saving mode compared to the case where all processes performed in the executable mode are counted as execution counts for the executable mode.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: a processor for an apparatus having an executable mode and one or more types of power saving mode and setting a shift time from the executable mode to the power saving mode, the executable mode being a mode in which execution of a process is ready, the processor being configured to: detect change of a user who operates the apparatus; obtain an index value based on counts of execution of processes in the respective modes in the apparatus, and set the shift time based on the obtained index value; and, in the setting, count, as a single process, a plurality of processes in the count for the mode in which the first process of the plurality of processes is performed, the plurality of processes being performed continuously in a state in which the change is not detected.

BRIEF DESCRIPTION OF THE DRAWINGS

Exemplary embodiments of the present disclosure will be described in detail based on the following figures, wherein:

FIG. 12 is a diagram for describing an example of counting according to the count control;

FIG. 15 is a diagram illustrating an exemplary procedure of controlling ON/OFF of count control or the like.

DETAILED DESCRIPTION

Base Configuration Example

Figure 1:
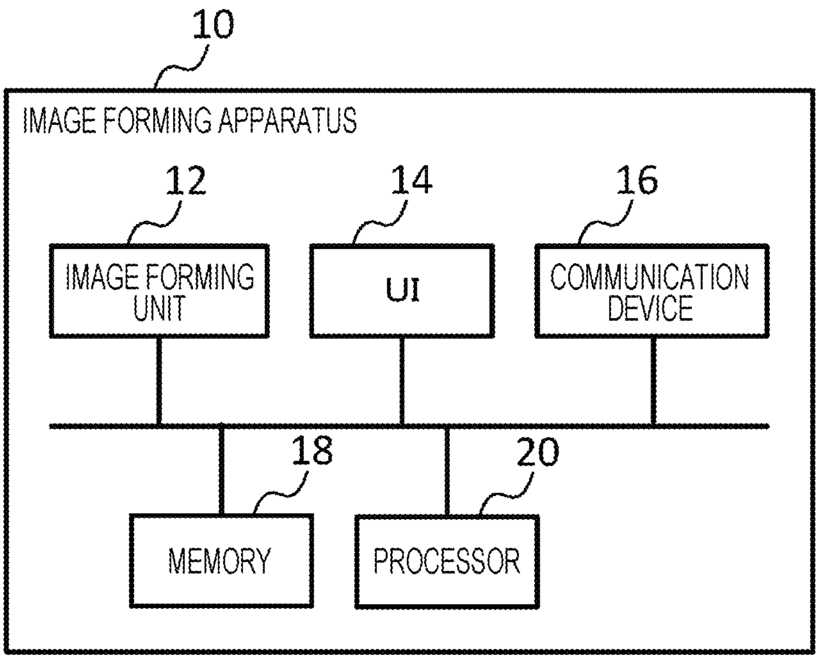
FIG. 1 is a block diagram illustrating the hardware configuration of an image forming apparatus.

An exemplary configuration of an image forming apparatus 10, to which the control according to an exemplary embodiment is applied, (hereinafter referred to as a "base configuration example") will be described by referring to FIG. 1. Feature configurations and processes specific to the exemplary embodiment will be described after the description about the base configuration example. FIG. 1 is a block diagram illustrating the hardware configuration of the image forming apparatus 10 according to the base configuration example.

The image forming apparatus 10 includes an image forming unit 12, a user interface (UI) 14, a communication device 16, a memory 18, and a processor 20. The image forming apparatus 10 is a printer, a scanner, a copier, a facsimile, or a multifunction device (for example, a device having functions of multiple devices, such as a printer, a scanner, and a copier). The image forming apparatus 10 is an exemplary information processing system.

The image forming unit 12 has at least one function among a print function, a scan function, a copy function, and a facsimile function. The system of printing, the system of scanning, and the like of the image forming unit 12 are not particularly limited. For example, an electrophotographic system, an inkjet system, a thermography system, or a thermal transfer system is used as the system of printing.

The UI 14, which is a user interface, includes a display and an input device. The display is, for example, a liquid-crystal display or an electroluminescence (EL) display. The input device is, for example, a keyboard, a mouse, and input keys, or an operation panel. The UI 14 may be a UI such as a touch panel (for example, an operation panel) serving as a display and an input device.

The communication device 16 includes one or more communication interfaces each having a communication chip, a communication circuit, or the like. The communication device 16 has a function of transmitting information to other apparatuses and a function of receiving information from other apparatuses. The communication device 16 may have a wireless communication function, such as Near Field Communication or Wi-Fi™, or may have a wired communication function.

The memory 18 is a device including one or more storage areas in which data is stored. The memory 18 is, for example, a hard disk drive (HDD), a solid-state drive (SSD), various types of memory (for example, a random-access memory (RAM), a dynamic random access memory (DRAM), a nonvolatile random access memory (NVRAM), and a read-only memory (ROM)), other types of storage device (for example, an optical disc), or a combination of these. The processor 20 controls operations of the units of the image forming apparatus 10.

The image forming apparatus 10 has multiple modes having different times elapsing until execution of a process is ready. The time until execution of a process is ready may be a time for which a user waits for execution of the process. Thus, the time may be a waiting time of the user.

For example, the modes include ready mode and power saving mode. The power saving mode is a mode in which the time (that is, the waiting time) until execution of a process is ready is longer than that in the ready mode. The power saving mode may include multiple modes having different times elapsing until execution of a process is ready.

The ready mode is a mode in which the image forming apparatus 10 waits for execution of a process. The ready mode is a mode, in which power is supplied to the image forming apparatus 10 having warmed up and the image forming apparatus 10 is ready to perform a process, but is a mode in which the image forming apparatus 10 is not performing a process. Examples of a process include a print job, a scan job, a copy job, a job of transferring, to an external apparatus, image data generated through scanning, and a job of storing, in the image forming apparatus 10, image data generated through scanning. As a matter of course, these processes are merely examples. A process other than these processes may be performed by the image forming apparatus 10. A process performed by a user who operates the UI 14 may be a process according to the present base configuration example.

The power saving mode is a mode in which some components of the image forming apparatus 10 are not supplied with power, or a mode in which some or all components in the image forming apparatus 10 are supplied with power lower than that in the ready mode. The power consumed in the power saving mode is lower than that in the ready mode.

In the description below, the time until the mode of the image forming apparatus 10 is shifted from the ready mode to the power saving mode is referred to as a "shift time". The set value of the shift time is stored in the memory 18. The processor 20 shifts the mode of the image forming apparatus 10 from the ready mode to the power saving mode in accordance with the shift time.

For example, assume the case in which the image forming apparatus 10 is in the ready mode. In this case, when the shift time elapses from when the image forming apparatus 10 has performed a process last (for example, when the process has been completed), or from when the image forming apparatus 10 has been operated by a user last, the processor 20 shifts the mode of the image forming apparatus 10 from the ready mode to the power saving mode. That is, when the time for which the image forming apparatus 10 does not perform a process such as a job or the time for which the UI 14 is not operated by a user is longer than or equal to the shift time, the processor 20 shifts the mode of the image forming apparatus 10 from the ready mode to the power saving mode.

In the case where the image forming apparatus 10 is in the ready mode, when a user gives an instruction for a shift to the power saving mode (for example, when a power-saving button disposed on the image forming apparatus 10 is pressed), the processor 20 may shift the mode of the image forming apparatus 10 from the ready mode to the power saving mode.

In the case where the image forming apparatus 10 is in the power saving mode, when a specific event occurs, the processor 20 shifts the mode of the image forming apparatus

10 from the power saving mode to the ready mode. Thus, the mode of the image forming apparatus 10 is returned to the ready mode.

The specific event is an event corresponding to an instruction to return to the ready mode. Examples of a specific event include an operation on the UI 14, reception of a job, reception of an instruction to perform a job, and pressing of a wake-up button. These are merely exemplary specific events. An event other than these may be defined as a specific event.

For example, when the UI 14 is operated by a user, the processor 20 shifts the mode of the image forming apparatus 10 from the power saving mode to the ready mode.

When the image forming apparatus 10 receives an instruction to perform a process, the processor 20 may shift the mode of the image forming apparatus 10 from the power saving mode to the ready mode. For example, when a print job is transmitted from an external apparatus to the image forming apparatus 10 and the processor 20 receives the print job, the processor 20 determines that a specific event has occurred, and shifts the mode of the image forming apparatus 10 from the power saving mode to the ready mode. The processor 20 controls the image forming unit 12 in accordance with the received print job to perform the print job.

When a wake-up button, which is disposed on an operation panel or the like of the image forming apparatus 10, is pressed, the processor 20 may shift the mode of the image forming apparatus 10 from the power saving mode to the ready mode.

When the power saving mode includes multiple different modes, a shift time is set to each mode, and the set value of each shift time is stored in the memory 18.

For example, the power saving mode includes Low Power mode (hereinafter referred to as "LP mode") and Sleep mode (hereinafter referred to as "SP mode").

The LP mode is a mode in which the time (that is, the waiting time) until execution of a process is ready is longer than that in the ready mode. The SP mode is a mode in which the time (that is, the waiting time) until execution of a process is ready is longer than that in the LP mode. The power consumed in the SP mode is lower than that in the LP mode. That is, the SP mode is a mode achieving a power-saving effect higher than that in the LP mode. In one example, the ready mode corresponds to an executable mode; the LP mode corresponds to a first power saving mode; the SP mode corresponds to a second power saving mode. Alternatively, the LP mode and the SP mode may be collectively regarded as the power saving mode.

In the ready mode, the units of the image forming apparatus 10 are supplied with power. For example, the image forming unit 12, the UI 14, the communication device 16, the memory 18, and the processor 20 are supplied with power. The image forming apparatus 10 is ready to perform a process such as a print job.

In the LP mode, the units of the image forming apparatus 10 are supplied with power lower than that in the ready mode. For example, in the LP mode, the scanner included in the image forming unit 12 and the operation panel included in the UI 14 are not supplied with power, or are supplied with power lower than that in the ready mode. For example, when the operation panel includes a backlight, the backlight is switched off. In the LP mode, the memory 18 and the processor 20 are supplied with power.

In the SP mode, the units of the image forming apparatus 10 are supplied with power lower than that in the LP mode. For example, in the SP mode, the image forming unit 12 and the UI 14 are not supplied with power, or are supplied with power lower than that in the LP mode. The power supplied to the memory 18 and the processor 20 may be lower than that in the LP mode.

The forms of power supply in the ready mode, the LP mode, and the SP mode, which are described above, are merely exemplary. Alternatively, forms of power supply other than those described above may be performed. The forms of power supply in the modes may be set by a user.

For example, the processor 20 changes the mode of the image forming apparatus 10 in the order of the ready mode, the LP mode, and the SP mode.

The set value of a first shift time (hereinafter referred to as an "LP shift time") until the mode of the image forming apparatus 10 is shifted from the ready mode to the LP mode is stored in the memory 18, and the LP shift time is set to the image forming apparatus 10. The LP shift time is a time from the time point of start of the ready mode to the time point of start of the LP mode.

The set value of a second shift time (hereinafter referred to as an "SP shift time") until the mode of the image forming apparatus 10 is shifted from the ready mode to the SP mode is stored in the memory 18, and the SP shift time is set to the image forming apparatus 10. The SP shift time is a time from the time point of start of the ready mode to the time point of start of the SP mode. The SP shift time is set to the same time as the LP shift time or a time longer than the LP shift time. Thus, in many cases, the mode of the image forming apparatus 10 is shifted in the order of the ready mode, the LP mode, and the SP mode. When the SP shift time is the same as the LP shift time, the mode of the image forming apparatus 10 is shifted from the ready mode, not to the LP mode, but to the SP mode. The SP shift time may be a time from the time point of start of the LP mode to the time point of start of the SP mode.

In the case where the image forming apparatus 10 is in the ready mode, when the time for which the image forming apparatus 10 does not perform a job or the time for which the UI 14 is not operated by a user is longer than or equal to the LP shift time, the processor 20 shifts the mode of the image forming apparatus 10 from the ready mode to the LP mode. That is, when the LP shift time elapses from the time point when a process or an operation has been performed last, the processor 20 shifts the mode of the image forming apparatus 10 from the ready mode to the LP mode. In the case where the image forming apparatus 10 is in the LP mode, when a specific event which causes a return to the ready mode occurs, the processor 20 shifts the mode of the image forming apparatus 10 from the LP mode to the ready mode.

Even when the time for which the image forming apparatus 10 does not perform a process or the time for which the UI 14 is not operated by a user is shorter than the LP shift time, the processor 20 may shift the mode of the image forming apparatus 10 from the ready mode to the LP mode. For example, when the image forming apparatus 10 is in the LP mode and the processor 20 receives a print job from an external apparatus, the processor 20 shifts the mode of the image forming apparatus 10 from the LP mode to the ready mode to perform the print job. Without waiting until the LP shift time elapses after completion of the print job, the processor 20 may return the mode of the image forming apparatus 10 to the power saving mode (LP mode) which is the mode at the time point when the processor 20 has received the print job. That is, in the case where the image forming apparatus 10 is in the LP mode, when the processor 20 receives a print job, the mode of the image forming apparatus 10 is returned to the LP mode immediately after completion of the print job.

In the case where the image forming apparatus 10 is in the LP mode, when the time for which the image forming apparatus 10 does not perform a process or the time for which the UI 14 is not operated by a user is longer than or equal to the SP shift time, the processor 20 shifts the mode of the image forming apparatus 10 from the LP mode to the SP mode. That is, when the SP shift time elapses from the time point when a process or an operation has been performed last, the processor 20 shifts the mode of the image forming apparatus 10 from the LP mode to the SP mode. In the case where the image forming apparatus 10 is in the SP mode, when a specific event which causes a return to the ready mode occurs, the processor 20 shifts the mode of the image forming apparatus 10 from the SP mode to the ready mode.

Even when the time for which the image forming apparatus 10 does not perform a process or the time for which the UI 14 is not operated by a user is shorter than the SP shift time, the processor 20 may shift the mode of the image forming apparatus 10 from the ready mode to the SP mode. For example, in the case where the image forming apparatus 10 is in the SP mode, when the processor 20 receives a print job from an external apparatus, the processor 20 shifts the mode of the image forming apparatus 10 from the SP mode to the ready mode to perform the print job. Without waiting until the SP shift time elapses after completion of the print job, the processor 20 may return the mode of the image forming apparatus 10 to the power saving mode (SP mode) which is the mode at the time point when the processor 20 has received the print job. That is, in the case where the image forming apparatus 10 is in the SP mode, when the processor 20 receives a print job, the mode of the image forming apparatus 10 is returned to the SP mode immediately after completion of the print job.

The time (that is, the waiting time) required for a shift from the power saving mode to the ready mode is different depending on the type of the power saving mode. Power supplied in the SP mode is lower than that in the LP mode. Therefore, the time required for a shift from the SP mode to the ready mode is longer than that from the LP mode to the ready mode.

The LP mode and the SP mode are merely exemplary power saving modes. The image forming apparatus 10 may have three or more different power saving modes. As a matter of course, the power saving mode may be a single mode.

Figure 2:
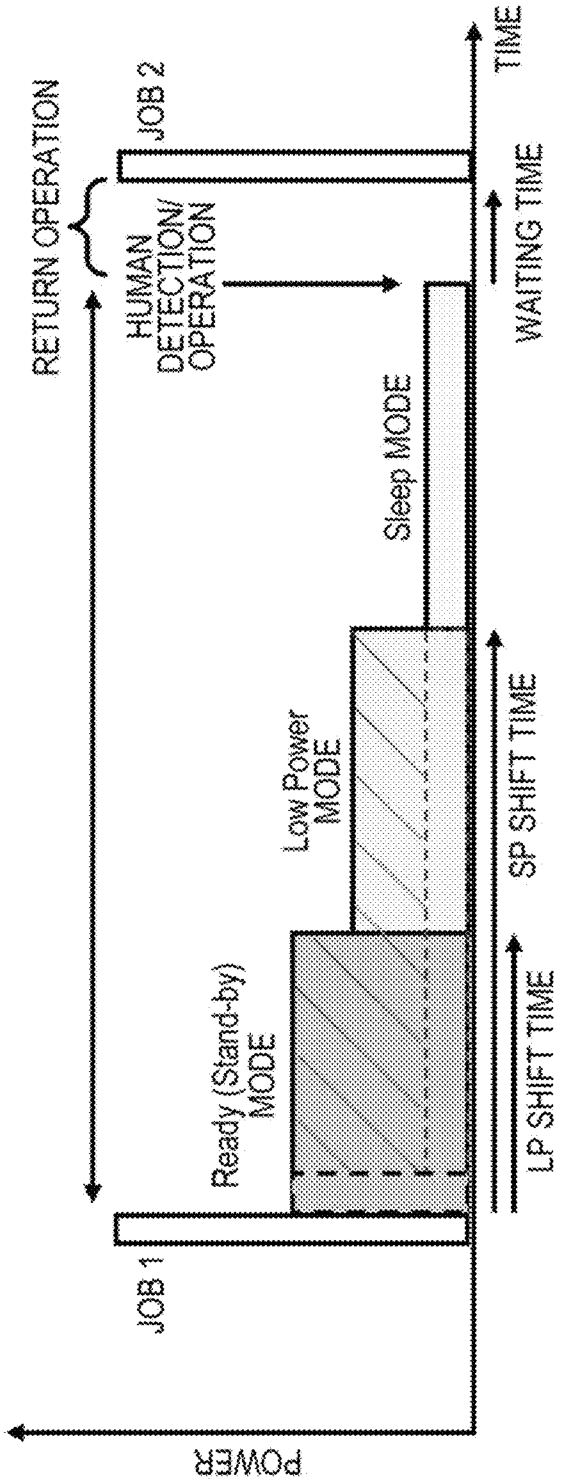
FIG. 2 is a diagram illustrating modes of an image forming apparatus.

FIG. 2 illustrates power levels consumed in the ready mode, the LP mode, and the SP mode. In FIG. 2, the horizontal axis represents time; the vertical axis represents power consumption. In this example, jobs, which serve as processes, are performed.

For example, when the image forming apparatus 10 performs Job 1 (for example, a print job) and the execution of Job 1 completes, the mode of the image forming apparatus 10 is shifted to the ready mode. When the LP shift time elapses from the time point of completion of Job 1 without execution of any job or operation, the processor 20 shifts the mode of the image forming apparatus 10 from the ready mode to the LP mode. Further, when the SP shift time elapses from the time point of completion of Job 1 without execution of a job or operation, the processor 20 shifts the mode of the image forming apparatus 10 from the LP mode to the SP mode.

In the case where the image forming apparatus 10 is in the SP mode, when a specific event which causes a return to the ready mode occurs (for example, when the UI 14 is operated or the processor 20 receives a job), the processor 20 shifts the mode of the image forming apparatus 10 from the SP mode to the ready mode. When the processor 20 receives a job (for example, Job 2), the processor 20 performs Job 2 which has been received. The time from the time point of completion of the SP mode to the time point of start of execution of Job 2 corresponds to the waiting time of the SP mode.

In the case where the image forming apparatus 10 is in the LP mode, when a specific event which causes a return to the ready mode occurs, the processor 20 shifts the mode of the image forming apparatus 10 from the LP mode to the ready mode. The time from the time point of completion of the LP mode to the time point of start of execution of a job corresponds to the waiting time of the LP mode.

For example, the waiting time of the SP mode is three seconds; the waiting time of the LP mode is one second or less. In the case where the image forming apparatus 10 is in the ready mode, the time required until execution of a job (that is, the time corresponding to the waiting time of the ready mode) is one second or less. These times are merely exemplary, and may change, for example, depending on the type, function, or performance of the image forming apparatus 10.

Typically, as a shift time, such as the LP shift time or the SP shift time, is longer, the time until the mode of the image forming apparatus 10 is shifted to the LP mode or the SP mode is longer, resulting in improvement of user convenience. In contrast, this creates a larger standby power consumption, resulting in degradation of power saving. Conversely, a shorter shift time causes improvement of power saving but causes reduction of user convenience. A user may set a shift time in accordance with the utilization of the image forming apparatus 10 (for example, the frequency of execution of jobs). However, such setting by a user is difficult to achieve both improvement of convenience and improvement of power saving.

In the present base configuration example, the processor 20 manages a history (hereinafter, referred to as a "process history") indicating the count of processes performed in each of at least two modes. Information indicating the process history is stored in the memory 18. On the basis of the process history and the target value of the ratio of specific processes performed by the image forming apparatus 10, the processor 20 outputs the set value of a shift time elapsing until the image forming apparatus 10 is shifted to a mode in which a time until execution of a process is ready is longer than that in another mode. For example, the set value is stored in the memory 18. In accordance with the set value, the processor 20 shifts the mode of the image forming apparatus 10 to the mode in which the time until execution of a process is ready is longer than that in another mode. The set value of a shift time may be a set value of the SP shift time, may be a set value of the LP shift time, or may be set values of both the SP shift time and the LP shift time. For example, the target value of the ratio of specific processes corresponds to convenience of users of the image forming apparatus 10. For example, the convenience is evaluated in view of whether the image forming apparatus 10 is allowed to be used with a shorter waiting time. The target value of the ratio of specific processes is a target value corresponding to the ratio of the count of processes which is described below.

The count of processes may be the count of operations on the UI 14, may be the count of execution of jobs, such as a print job and a copy job, or may be the total of the count of operations on the UI 14 and the count of execution of jobs.

For example, the process history includes the count of processes performed in a predetermined period.

In the description below, the count of processes performed in the ready mode is referred to as "R"; the count of processes performed in the LP mode is referred to as "LP"; the count of processes performed in the SP mode is referred to as "SP".

For example, the process history may include the count of processes performed in all the modes. That is, the process history in this case includes the total of the count of processes performed in the ready mode, the count of processes performed in the LP mode, and the count of processes performed in the SP mode. Hereinafter, the total is referred to as the total process count: total process count=R+LP+SP.

The process history may include the total of the counts of processes performed in the power saving mode. That is, the process history in this case includes the total of the count of processes performed in the LP mode and the count of processes performed in the SP mode. Hereinafter, the total is referred to as the process count in the power saving mode: process count in power saving mode=LP+SP.

The predetermined period may be defined by a user. Examples of the predetermined period include a period in hours, a period in days, a period in weeks, a period in months, and any other periods.

If the count of operations on the UI 14 in the period is less than or equal to a predetermined count, the history may include the count of execution of jobs, such as a print job and a copy job, or the total of the counts.

For example, the processor 20 counts processes performed in at least two modes among the ready mode, the LP mode, and the SP mode, and stores, in the memory 18, information indicating the count of processes performed in each mode (that is, information indicating the process history).

The count of processes performed in the ready mode is the count of processes performed when the image forming apparatus 10 is in the ready mode.

The count of processes performed in the LP mode is the count of processes performed when the image forming apparatus 10 is in the LP mode. In other words, the count of processes performed in the LP mode is the count of occurrence of specific events when the image forming apparatus 10 is in the LP mode. For example, the count of processes performed in the LP mode includes the following counts in the image forming apparatus 10 which is in the LP mode: the count of shifts of the mode of the image forming apparatus 10 from the LP mode to the ready mode due to operations on the UI 14; the count of shifts of the mode of the image forming apparatus 10 from the LP mode to the ready mode due to jobs received by the processor 20.

The count of processes performed in the SP mode is the count of processes performed when the image forming apparatus 10 is in the SP mode. In other words, the count of processes performed in the SP mode is the count of occurrence of specific events when the image forming apparatus 10 is in the SP mode. For example, the count of processes performed in the SP mode includes the following counts in the image forming apparatus 10 which is in the SP mode: the count of shifts of the mode of the image forming apparatus 10 from the SP mode to the ready mode due to operations on the UI 14; the count of shifts of the mode of the image forming apparatus 10 from the SP mode to the ready mode due to jobs received by the processor 20.

The target value may be predetermined, may be determined by a user, or may be calculated through learning for calculating the target value.

The set value which is output may be a set value of the LP shift time, may be a set value of the SP shift time, or may be values of both the LP shift time and the SP shift time.

When the set value which is output is a set value of the LP shift time, the processor 20 shifts the mode of the image forming apparatus 10 from the ready mode to the LP mode in accordance with the set value which is output. When the set value which is output is a set value of the SP shift time, the processor 20 shifts the mode of the image forming apparatus 10 from the LP mode to the SP mode in accordance with the set value which is output.

When only either one of the LP mode and the SP mode is set as the power saving mode, the set value which is output is a set value of the shift time in the mode which is set as the power saving mode. In this case, the processor 20 shifts the mode of the image forming apparatus 10 from the ready mode to the set mode in accordance with the set value.

For example, the process history includes the ratio related to the counts of processes performed in the respective at least two modes. Exemplary ratios are the following:

$$(R+LP)/(R+LP+SP), \quad \text{ratio 1}$$

$$LP/(LP+SP), \quad \text{ratio 2}$$

where, as described above, R, LP, and SP represent the count of processes performed in the ready mode, the count of processes performed in the LP mode, and the count of processes performed in the SP mode, respectively.

Ratios 1 and 2 described above correspond to values indicating convenience of users of the image forming apparatus 10. Specifically, each of ratios 1 and 2 is the ratio of the count of processes for which the waiting time is less than or equal to a threshold. For example, the threshold is one second. The threshold is merely exemplary, and is determined, for example, depending on the type, function, or performance of the image forming apparatus 10. For example, since each of the waiting time of the ready mode and the waiting time of the LP mode is one second or less, the threshold is set to one second. If these waiting times change, the threshold is set in accordance with the change. When the threshold is set to one second, each of ratios 1 and 2 corresponds to the ratio of processes performed after a waiting time which is one second or less. The higher ratio 1 is, the larger the count of processes performed after a waiting time which is one second or less is. This may indicate higher user convenience in view of earlier execution of jobs. The same is true for ratio 2. Therefore, ratios 1 and 2 represent user convenience.

Ratio 1 is the ratio of the count of processes, for which the waiting time is less than or equal to the threshold, with respect to the count of processes performed in all the modes. The count of processes performed in all the modes is the total of the count of processes performed in the ready mode, the count of processes performed in the LP mode, and the count of processes performed in the SP mode. The count of processes, for which the waiting time is less than or equal to the threshold, is the total of the count of processes performed in the ready mode and the count of processes performed in the LP mode.

Ratio 2 is a ratio calculated without using the count of processes performed in the ready mode, and is a ratio obtained by simplifying ratio 1. Ratio 2 may be a simplified ratio. The processes performed in the LP mode are counted by counting returns of the mode of the image forming apparatus 10 from the LP mode to the ready mode. Processes performed in the SP mode are counted by counting returns of the mode of the image forming apparatus 10 from the SP mode to the ready mode. In contrast, for the ready mode, processes performed in the ready mode are counted by counting, not returns, but processes actually performed in the ready mode. For example, when processes (for example, print jobs) are performed continuously in the ready mode, a shift between modes does not occur. Thus, it may be difficult to accurately count jobs performed continuously. That is, it may not be obvious whether the count of processes which are continuously performed is one, or more than one. Use of ratio 2 eliminates necessity of counting processes performed in the ready mode.

A user may select, from ratios 1 and 2, a ratio to be used, or a ratio to be used may be predetermined.

Figure 3:
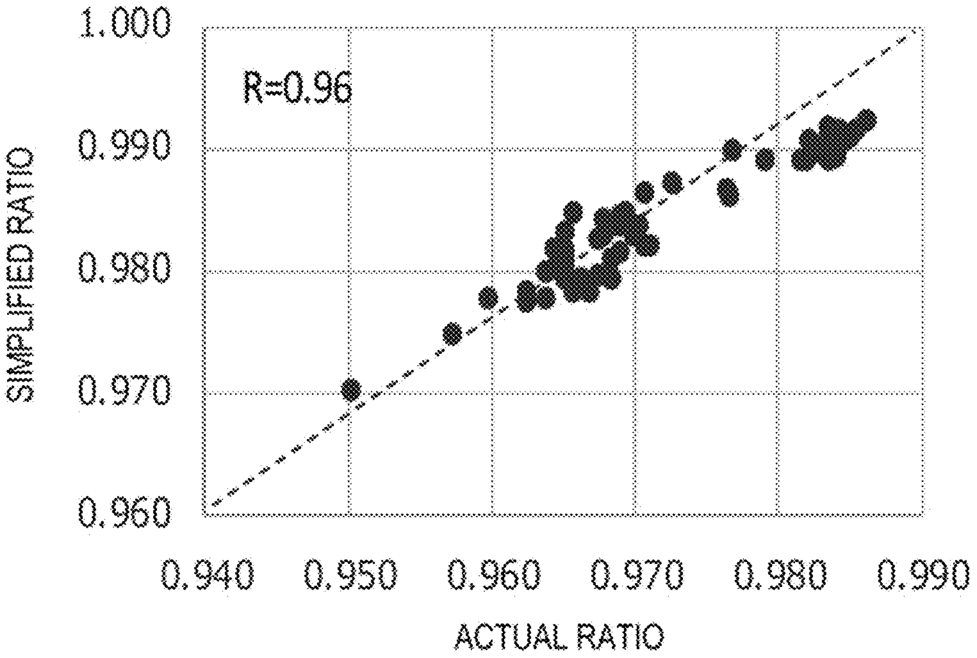
FIG. 3 is a graph of the relationship between actual ratio and simplified ratio.

Referring to FIG. 3, the relationship between ratio 1 and ratio 2 will be described. FIG. 3 illustrates a graph of the relationship between ratio 1 and ratio 2. The horizontal axis represents ratio 1 which is an actual ratio. The vertical axis represents ratio 2 which is a simplified ratio. As illustrated in FIG. 3, there is a correlation between ratio 1 and ratio 2. Thus, instead of calculation of ratio 1, calculation of ratio 2 enables the ratio of the count of processes, for which the waiting time is less than or equal to the threshold, to be calculated.

For example, the processor 20 calculates the set value of a shift time from processes and the target value by using a cumulative exponential distribution function.

Figure 4:
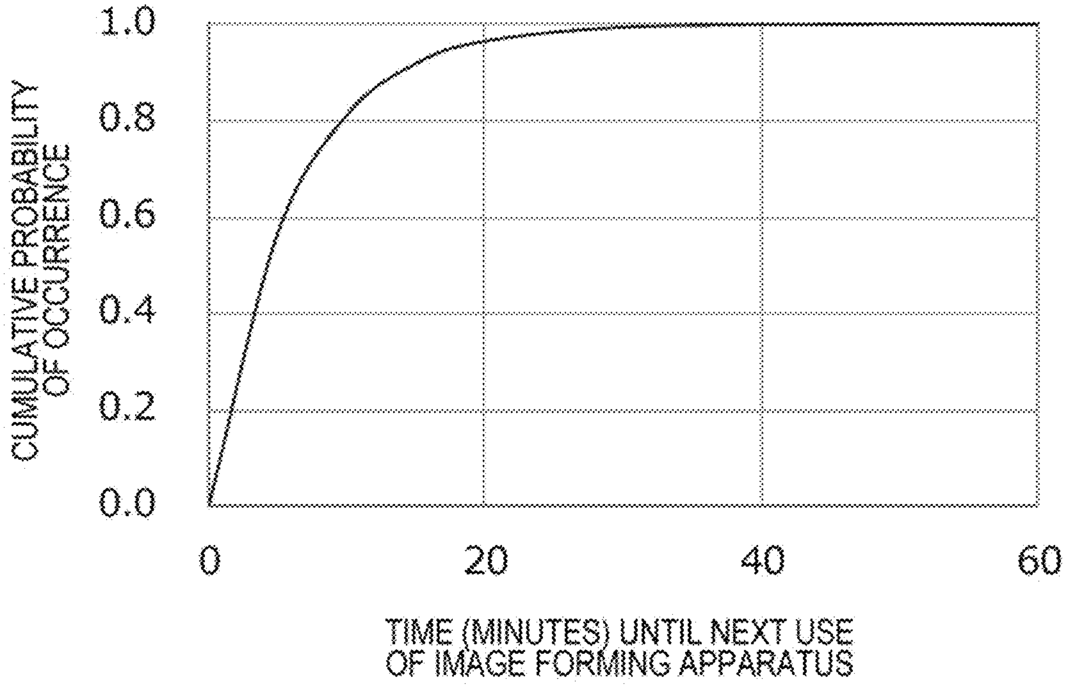
FIG. 4 is a graph of a cumulative exponential distribution.

Referring to FIG. 4, the cumulative exponential distribution function will be described. FIG. 4 illustrates an exemplary cumulative exponential distribution function. The horizontal axis represents time (minutes) elapsing until next use of the image forming apparatus 10; the vertical axis represents cumulative probability f(t) of occurrence.

The cumulative probability f(t) of occurrence is a probability that events occur, in a unit time, λ times in average, and is expressed in Expression (1):

$$f(t) = 1 - e^{\wedge}(-\lambda t), \tag{1}$$

where t represents time.

The time until next use of the image forming apparatus 10 corresponds to a shift time (for example, the SP shift time). The cumulative probability of occurrence corresponds to the probability that the image forming apparatus 10 is allowed to be used without a shift of the image forming apparatus 10 to the SP mode. Specifically, the cumulative probability of occurrence corresponds to a ratio described above (for example, ratio 1 or ratio 2).

The distribution obtained when the image forming apparatus 10 is actually used (for example, the relationship between the SP shift time and ratio) does not match an ideal cumulative exponential distribution. However, the actual distribution is close to the ideal cumulative exponential distribution. In the present base configuration example, for example, the processor 20 estimates the cumulative exponential distribution function by learning such as machine learning, and calculates the set value of the shift time by using the estimated cumulative exponential distribution function.

The processor 20 estimates a cumulative exponential function on the basis of the process history in a learning period, and calculates the set value of a shift time. The learning period is a predetermined period, and is, for example, a period in units of hours (for example, one hour or two hours), a period in units of days (for example, one day or two days), a period in units of weeks (for example, one week or two weeks), or a period in units of months (for example, one month or two months). In accordance with the calculated shift time, the processor 20 controls shifting the mode of the image forming apparatus 10. After the learning period, the processor 20 learns a cumulative exponential function for each unit control period to update the set value of the shift time. The unit control period is a predetermined period, and is, for example, a period in units of hours (for example, one hour or two hours), a period in units of days (for example, one day or two days), a period in units of weeks (for example, one week or two weeks), or a period in units of months (for example, one month or two months).

The processor 20 counts processes performed in each of the ready mode, the LP mode, and the SP mode in the learning period. For example, for the LP mode and the SP mode, the processor 20 counts shifts from the LP mode to the ready mode (that is, returns from the LP mode) in the learning period, and counts shifts from the SP mode to the ready mode (that is, returns from the SP mode) in the learning period. The count of processes is not limited to the count of execution of jobs, and the count of operations on the UI 14 may be included in the count of processes. That is, the count of mode shifts to the ready mode due to operations on the UI 14 may be included in the count of processes.

For example, on the basis of the counts of processes performed in the learning period, the processor 20 calculates ratio 1 (=(R+LP)/(R+LP+SP)). The processor 20 may calculate ratio 2 (=LP/(LP+SP)) which is a simplified ratio. In the case of use of ratio 2, processes performed in the ready mode are not necessarily counted. In this example, ratio 1 is used.

To avoid impossibility of calculating a cumulative index, extreme values may be used. For example, when ratio 1 exceeds 0.99 (that is, when ratio 1 exceeds 99%), the processor 20 may use 0.99 (that is, 99%) as ratio 1. When ratio 1 is less than 0.01 (that is, when ratio 1 is less than 1%), the processor 20 may use 0.01 (that is, 1%) as ratio 1.

The processor 20 sets the target value. For example, as given by Expression (2), the processor 20 sets, to the target value, a value obtained by subtracting a predetermined value from ratio 1 obtained in the learning period. For example, the predetermined value, which may be set by a user, is 0.1 (that is, 10%):

$$\text{target value} = \text{ratio 1 in learning period} - 0.1. \tag{2}$$

As described above, ratio 1 represents user convenience. Thus, subtraction of the predetermined value (for example, 0.1) from the ratio in the learning period means that the convenience is reduced by that value.

When the target value is less than 0.01 (that is, in the case of less than 1%), the processor 20 sets 0.01 (that is, 1%) to the target value.

For example, when ratio 1 is 13%, the target value is 3%. When ratio 1 is 12%, the target value is 2%. When ratio 1 is 11%, the target value is 1%. When ratio 1 is 10%, the target value is 1%. When ratio 1 is 9%, the target value is 1%.

Through use of a cumulative exponential distribution function, a ratio (for example, ratio 1 or ratio 2) is given by Expression (3):

$$\text{ratio} = 1 - e\^{}(-\lambda \times \text{set value of } SP \text{ shift time}). \quad (3)$$

λ represents the average count of occurrence of events in a unit time, and is calculated by dividing the count (the total process count=R+LP+SP) of processes, which are performed in the latest period (for example, the latest week), by its corresponding use time (for example, a value obtained by converting the use time in the latest week to hour units).

The use time may be calculated by predetermining a use time (for example, eight hours per day) per average day and multiplying the predetermined use time by the number of days of use, or may be calculated, for example, from the power supply time of the image forming apparatus 10.

Expression (4) described below is obtained from transformation of Expression (3). Thus, the set value of the SP shift time in the latest period (for example, the latest week) and the ratio in that period (for example, ratio 1) are substituted into Expression (4) to calculate λ:

$$\lambda = \log_e(1 - \text{ratio})/(\text{set value of } SP \text{ shift time}). \quad (4)$$

The process count (LP+SP) in the power saving mode may be used as the count of processes performed in the latest period (for example, the latest week).

Expression (5) is obtained through transformation of Expression (3):

$$\text{set value of } SP \text{ shift time} = -\log_e(1 - \text{ratio})/\lambda. \quad (5)$$

On the basis of Expression (5), the processor 20 calculates the set value of the SP shift time for setting ratio 1 in the next week to the target value (that is, ratio 1 in the learning period −0.1). Expression (6) described below is an expression to calculate the set value:

$$\text{set value of } SP \text{ shift time in next week} = -\log_e(1 - \text{target value})/\lambda. \quad (6)$$

The processor 20 rounds off, to the nearest integer, the set value of the SP shift time in the next week.

The processor 20 may compensate the set value of the SP shift time in the next week, which is obtained by using Expression (6).

When the initial value of the SP shift time<the set value of the SP shift time in the next week, the processor 20 replaces the set value of the SP shift time in the next week by the initial value, and continues automatic control. In the case of the initial value of 60, when this condition is satisfied, the set value of the SP shift time in the next week is set to 60.

When the set value of the SP shift time in the next week is below the lower limit settable for the SP shift time, the processor 20 replaces the set value of the SP shift time in the next week by the lower limit, and continues the automatic control. For example, the lower limit settable for the SP shift time is one. When the set value of the SP shift time in the next week is zero, that is, when the set value before the round-off is less than, for example, 0.5, this condition is satisfied. In this case, the set value of the SP shift time in the next week is set to one.

When 1≤the set value of the SP shift time in the next week≤the initial value, the processor 20 controls the image forming apparatus 10 in accordance with the calculated set value of the SP shift time in the next week.

When the count (for example, the total of the count of processes performed in the ready mode, the count of processes performed in the LP mode, and the count of processes performed in the SP mode) of processes in a first unit control period (for example, this week) is less than a threshold, the processor 20 may determine that the first unit control period is an invalid period. For example, the threshold is 25. The threshold may be set by a user. For example, in the case where the first unit control period is a single week, when the count in the single week is less than 25, the processor 20 determines that the period is an invalid period. For example, when it is determined that a unit control period is an invalid period, the processor 20 may use the set value in this week as the set value in the next week. For example, when the count of processes is less than the threshold, it is assumed that the way of using the image forming apparatus 10 is changed, for example, due to consecutive holidays or a long vacation.

Thus, when the count of processes in the first unit control period (for example, this week) is less than the threshold (for example, 25), the processor 20 outputs the set value of the shift time in the first unit control period as the set value of the shift time in the second unit control period (for example, the next week). That is, the processor 20 sets the set value of the shift time for this week to the set value of the shift time for the next week.

A concrete example of learning and control after the learning will be described below. A concrete example of learning will be described first and a concrete example of automatic control of modes using the learning result will be then described. Values described below are merely exemplary. The values may be changed, for example, in accordance with the operating environment of the image forming apparatus 10, user circumstances, and the functions of the image forming apparatus 10.

Learning Step

Step S01: At a Start

The processor 20 counts processes performed in each of the ready mode, the LP mode, and the SP mode during a learning period (that is, the counts of returns to the ready mode). The count of processes includes, not only the count of execution of jobs, but also the count of operations on the UI 14. For example, as a rule, a learning period is one week. Exceptionally, a learning period is extended on a week-by-week basis.

An initial set value is used as the SP shift time in the learning period. An initial set value may be used as the LP shift time in the learning period. Alternatively, when influence of the LP shift time on convenience is small, the shortest time which is settable may be used as the LP shift time in the learning period. For example, the time required until execution of a job in the ready mode (that is, the time corresponding to the waiting time of the ready mode) is less than or equal to one second. The waiting time of the SP mode is three seconds. The waiting time of the LP mode is less than or equal to one second. That is, the waiting time of the LP mode is less than or equal to one second, which is equivalent to that in the ready mode. Thus, in this example, the shortest time, one, is used as the LP shift time in learning.

Step S02: After One Week

According to the determination criteria described below, the processor 20 determines whether the process count in the first learning period (that is, the first week) is valid:

{count of processes performed in ready mode+count of processes performed in LP mode (that is, count of returns from LP mode)+count of processes performed in SP mode (that is, count of returns from SP mode) }≥25: valid, {count of processes performed in ready mode+count of processes performed in LP mode (that is, count of returns from LP mode)+count of processes performed in SP mode (that is, count of returns from SP mode) }<25: invalid.

If the process count is valid, the processor 20 stores, as a first-week actual value, the count of processes preformed in the ready mode, the count of returns from the LP mode, and the count of returns from the SP mode in the memory 18.

If the process count is invalid, the processor 20 discards the counts obtained in the learning period, and extends the learning period to the next week. If the process count is less than the threshold (for example, 25), it is assumed that the way of using the image forming apparatus 10 has been changed, for example, due to consecutive holidays or a long vacation. In this case, to avoid reflection of the influence on the next week, the counts are discarded and the learning period is extended to the next week.

Step S03: After Two Weeks

According to the same determination criteria as those in step S02, the processor 20 determines whether the process count obtained in the next learning period (that is, the second week) is valid.

If the process count is valid, when the first-week actual value is stored in the memory 18, the processor 20 stores a second-week actual value (that is, the count of processes preformed in the ready mode, the count of returns from the LP mode, and the count of returns from the SP mode, which are obtained in the second week) in the memory 18. The processor 20 ends the learning, and sets the target value. The process proceeds, not to step S04, but to step S05.

If the process count is valid, when the first-week actual value is not stored in the memory 18, the second-week actual value is stored in the memory 18 as the first-week actual value. The processor 20 extends the learning period to the next week, and continues the learning. The process proceeds to step S04.

If the process count is invalid, the processor 20 discards the counts obtained in the second week, extends the learning period to the next week, and continues the learning. The process proceeds to step S04.

Step S04: After Another Week

According to the same determination criteria as those in step S02, the processor 20 determines whether the process count obtained in another next learning period (that is, the third week) is valid.

If the process count is valid, when the first-week actual value is stored in the memory 18, the processor 20 stores, as the second-week actual value, a third-week actual value (that is, the count of processes performed in the ready mode, the count of returns from the LP mode, and the count of returns from the SP mode, which are obtained in the third week) in the memory 18. The processor 20 ends the learning, and sets the target value. The process proceeds to step S05.

If the process count is valid, when a first-week actual value is not stored in the memory 18, the third-week actual value is stored as the first-week actual value in the memory 18. The processor 20 extends the learning period to the next week, and continues the learning. For example, the processor 20 performs the same process in step S04 on the basis of the counts obtained in the next week.

If the process count is invalid, the processor 20 discards the counts obtained in the week, extends the learning period to the next week, and continues the learning.

The processor 20 may repeatedly perform the process in step S04.

Step S05: Setting the Target Value

The processor 20 calculates ratio 1, (R+LP)/(R+LP+SP). The counts of processes performed in the ready mode, which are included in the first-week actual value and the second-week actual value, are used as R. The counts of returns from the LP mode, which are included in the first-week actual value and the second-week actual value, are used as LP. The counts of returns from the SP mode, which are included in the first-week actual value and the second-week actual value, are used as SP. The count of processes performed in the ready mode, which is included in the first-week actual value or the second-week actual value, may be used as R. The count of returns from the LP mode, which is included in the first-week actual value or the second-week actual value, may be used as LP. The count of returns from the SP mode, which is included in the first-week actual value or the second-week actual value, may be used as SP.

For example, if ratio 1 exceeds 0.99 (that is, 99%), the processor 20 may use 0.99 as ratio 1. If ratio 1 is less than 0.01 (that is, 1%), the processor 20 may use 0.01 as ratio 1.

Then, the processor 20 calculates the target value according to Expression (2) described above. In this case, when the calculated target value is less than the lower limit (for example, 0.01), the processor 20 sets the lower limit to the target value.

Automatic Control Step

Step S11: At a Start

After the target value is calculated in the learning step, the processor 20 then calculates the set value of a shift time. In this example, the processor 20 calculates the set value of the SP shift time. Of course, the processor 20 may calculate the set values of both the LP shift time and the SP shift time, or may calculate only the set value of the LP shift time.

(1) Calculate λ of the Cumulative Exponential Distribution Function

According to Expression (7) described below, the processor 20 calculates λ of the cumulative exponential distribution function:

$$\lambda = \text{total process count } (R+LP+SP) \text{ in learning period (two weeks)/ use time in learning period.} \quad (7)$$

The use time in the learning period may be calculated by predetermining, for example, an average use time (for example, eight hours per day) and multiplying the average use time by the number of days of use, or may be calculated, for example, from the power supply time of the image forming apparatus 10. In this example, the set value of the SP shift time in the learning period is the initial set value of the SP shift time.

(2) Calculate the Set Value of the SP Shift Time

Then, the processor 20 substitutes λ, which is calculated by using Expression (7) described above, and the target value into Expression (8) described below to calculate the set value of the SP shift time:

$$\text{set value of } SP \text{ shift time} = -\log_e(1 - \text{target value})/\lambda. \quad (8)$$

The target value in this example is a value calculated by using Expression (2) described above. The processor 20 rounds off the set value of the SP shift time to the nearest integer.

(3) Compensate the Set Value

The processor 20 may compensate the set value of the SP shift time. For example, when the set value of the SP shift time is greater than the initial value, the processor 20 sets the initial value to the set value of the SP shift time. When the set value of the SP shift time is zero, the processor 20 sets one to the set value of the SP shift time.

In accordance with the set value described above, the processor 20 controls shifting the mode of the image forming apparatus 10. The processor 20 counts processes, which are performed in the ready mode, and processes (that is, returns from each of the LP mode and the SP mode), which are performed in each of the LP mode and the SP mode, during a unit control period (in this example, one week). The count of processes includes, not only the count of execution of jobs, but also the count of operations on the UI 14.

Step S12: After One Week (1) Determine Whether Data Is Valid

The processor 20 determines whether the process count obtained in the latest week is valid according to the determination criteria described below:

{count of processes performed in ready mode in latest week+count of processes performed in LP mode in latest week (that is, count of returns from LP mode)+count of processes performed in SP mode in latest week (that is, count of returns from SP mode)}≥25: valid, {count of processes performed in ready mode in latest week+count of processes performed in LP mode in latest week (that is, count of returns from LP mode)+count of processes performed in SP mode in latest week (that is, count of returns from SP mode)}<25: invalid.

If the process count is valid, the processor 20 performs processes in step S12 (2) and its subsequent steps which are described below.

If the process count is invalid, the processor 20 discards the counts obtained in the latest week, and does not perform processes in step S12 (2) and its subsequent steps. In this case, the processor 20 sets the set value of the SP shift time, which was used in this week, to the set value for the next week, and continues the control.

(2) Calculate λ of the Cumulative Exponential Distribution Function

If it is determined that the data is valid in step S12 (1) described above, the processor 20 performs processes in step S12 (2) and its subsequent steps. According to Expression (9) described below, the processor 20 calculates λ of the cumulative exponential distribution function:

$$\lambda = \text{total process count } (R + LP + SP) \text{ in latest week/ use time in latest week.} \quad (9)$$

The use time in the latest week may be calculated by predetermining, for example, an average use time (for example, eight hours per day) and multiplying the average use time by the number of days of use, or may be calculated, for example, from the power supply time of the image forming apparatus 10.

(3) Calculate the Set Value of the SP Shift Time

Then, the processor 20 substitutes λ, which is calculated by using Expression (9) described above, and the actual value of ratio 1 in the latest week into Expression (10) described below to calculate the set value of the SP shift time for the next week:

$$\text{set value of SP shift time for next week} = -\log_e(1 - \text{ratio 1 in latest week})/\lambda \quad (10).$$

The processor 20 rounds off the set value of the SP shift time to the nearest integer.

(4) A Branching Process Using the Set Value of the SP Shift Time

The processor 20 performs the process, described below, in accordance with the set value of the SP shift time for the next week which is calculated in step S12 (3):

(a) the initial value<the set value of the SP shift time: the processor 20 replaces the set value of the SP shift time for the next week by the initial value, and continues the automatic control, (b) 1≤the set value of the SP shift time<the initial value: the processor 20 adopts the calculated set value of the SP shift time for the next week, and continues the automatic control in accordance with the set value, (c) the set value of the SP shift time=0: the processor 20 replaces the set value of the SP shift time for the next week by one, and continues the automatic control.

If (a), (b), or (c) described above is satisfied, in the next week, the processor 20 controls shifting the mode of the image forming apparatus 10 in accordance with the calculated set value of the SP shift time for the next week.

Step S13: After Another Week

After that, the processor 20 performs the process in step S12 at the end of every week. Thus, the processor 20 repeatedly performs the process in step S12 at the end of every week.

Figure 5:
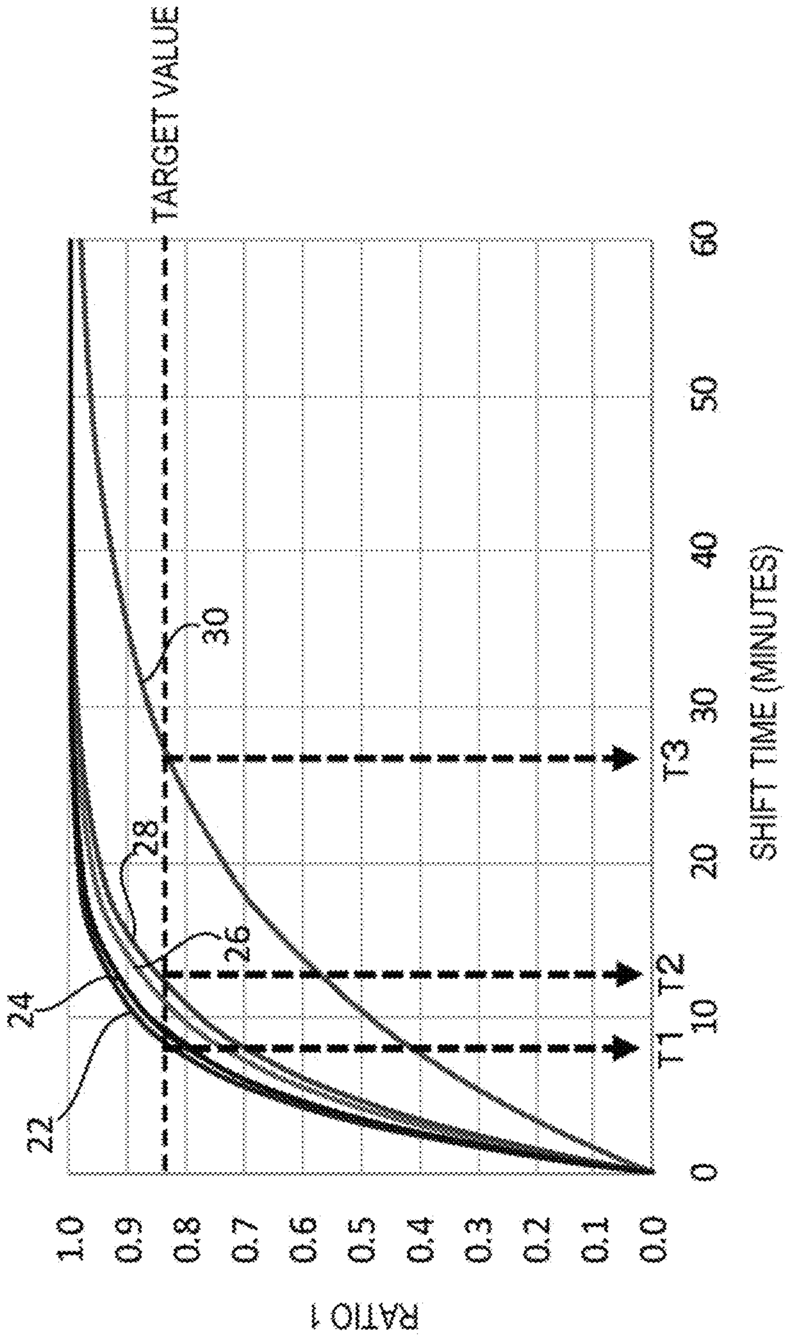
FIG. 5 is a graph of the relationship between shift time and ratio.

Referring to FIG. 5, the relationship between ratio 1 and the SP shift time will be described. FIG. 5 illustrates a graph showing the relationship. The horizontal axis represents the SP shift time; the vertical axis represents the actual value of ratio 1. The functions indicated by even-numbered curves 22 to 30 are calculated, for example, by using Expression (9) and Expression (10) described above.

The even-numbered curves 22 to 30 show the relationships between ratio 1 and the SP shift time in different weeks. The value of λ changes depending on the way of using the image forming apparatus 10 or its operating environment. As a result, the curves have different shapes, resulting in change of the shift time corresponding to the target value.

For example, when Curve 22 is obtained from use of the image forming apparatus 10 in a certain week, the shift time corresponding to the target value of ratio 1 is Shift time T1. In this case, the processor 20 sets T1 to the set value of the SP shift time, and controls shifting the mode of the image forming apparatus 10. Similarly, when Curve 28 is obtained, Shift time T2 is used as a set value. When Curve 30 is obtained, Shift time T3 is used as a set value. Thus, the set value of a shift time is changed in accordance with the way of using the image forming apparatus 10.

For example, the curve may change in accordance with the way of using the image forming apparatus 10, and the set value of a shift time may change. Specifically, the way of using the image forming apparatus 10 may change, for example, due to a busy period, consecutive holidays, or a long vacation, resulting in acquisition of a changed curve. Alternatively, the curve may change in accordance with the operating environment of the image forming apparatus 10, and the set value of a shift time may change. Specifically, a changed curve may be obtained, for example, due to business hours, business form, or the number of persons using the image forming apparatus 10. Even when the way of use or the operating environment changes, the set value of a shift time is calculated through learning, and shifting the mode of the image forming apparatus 10 is controlled in accordance with the set value.

The processor 20 may estimate the change of the environment of the image forming apparatus 10 on the basis of the change of the set value of a shift time. For example, when the difference between the set value in the latest unit control period and the set value in its immediately preceding unit control period is greater than or equal to a threshold, the processor 20 determines that the operating environment of the image forming apparatus 10 has changed. The threshold is predetermined. The threshold may be set by a user. When the difference is less than the threshold, the processor 20 determines that the operating environment of the image forming apparatus 10 has not changed.

For example, when the processor 20 determines that the operating environment of the image forming apparatus 10 has changed, the processor 20 resets the learning and performs the learning again. When the processor 20 determines that the operating environment of the image forming apparatus 10 has not changed, the processor 20 continues the automatic control.

For example, when the operating environment of the image forming apparatus 10 has changed, like Curve 30, the shape of an obtained curve is different by a large degree from the shapes of the other curves (for example, the even-numbered curves 22 to 28). Therefore, even when the target value is the same, the set value of a shift time, which is obtained from Curve 30, is different by a large degree from the set values of a shift time, which are obtained from the curves other than Curve 30 (for example, the even-numbered curves 22 to 28). That is, the difference between the set value of a shift time, which is obtained from Curve 30, and the set value of a shift time, which is obtained from a curve other than Curve 30, is greater than or equal to the threshold. Thus, through calculation of the difference between set values of a shift time, it may be determined whether the operating environment of the image forming apparatus 10 has changed.

The processor 20 may output information indicating that the operating environment of the image forming apparatus 10 has changed or information indicating that the operating environment of the image forming apparatus 10 has not changed. For example, the processor 20 may display the information on the display of the UI 14.

Concrete Examples

Figure 6:
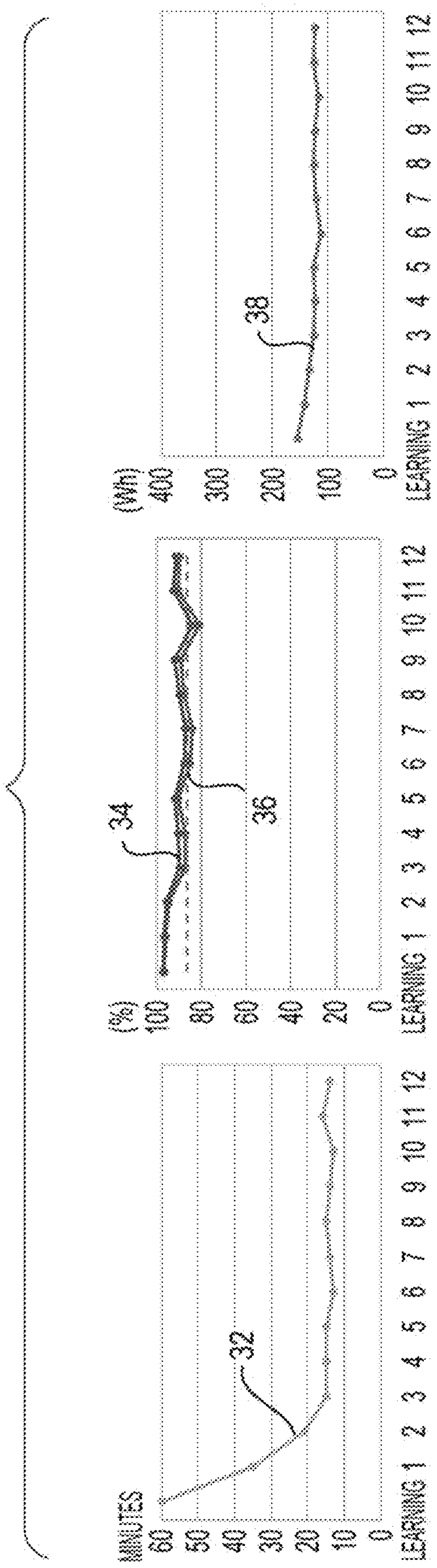
FIG. 6 is a diagram illustrating results of a first concrete example.
Figure 7:
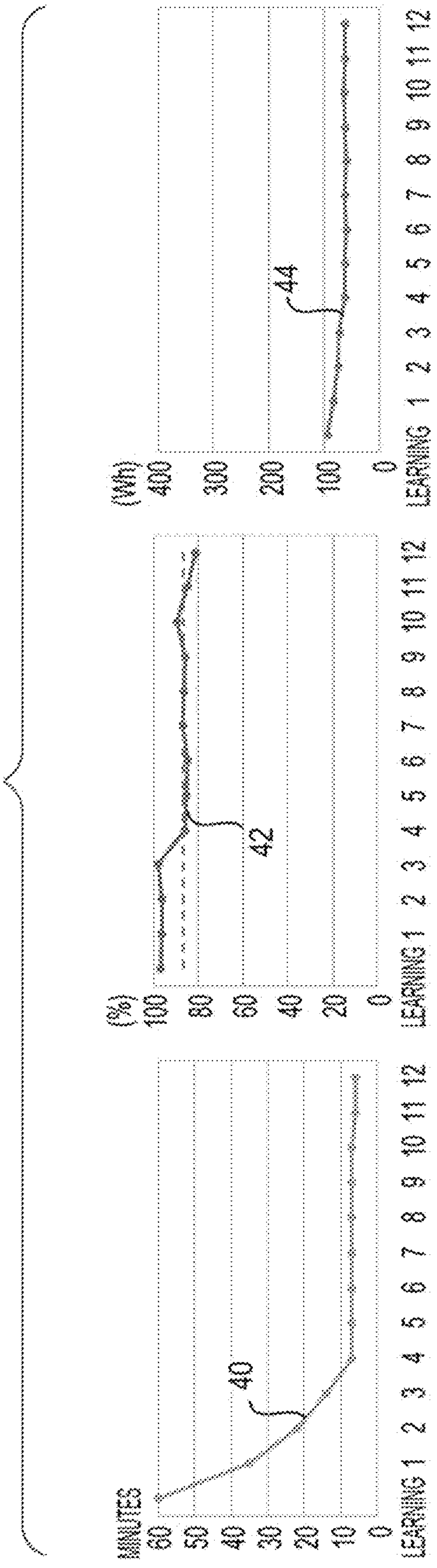
FIG. 7 is a diagram illustrating results of a second concrete example.
Figure 8:
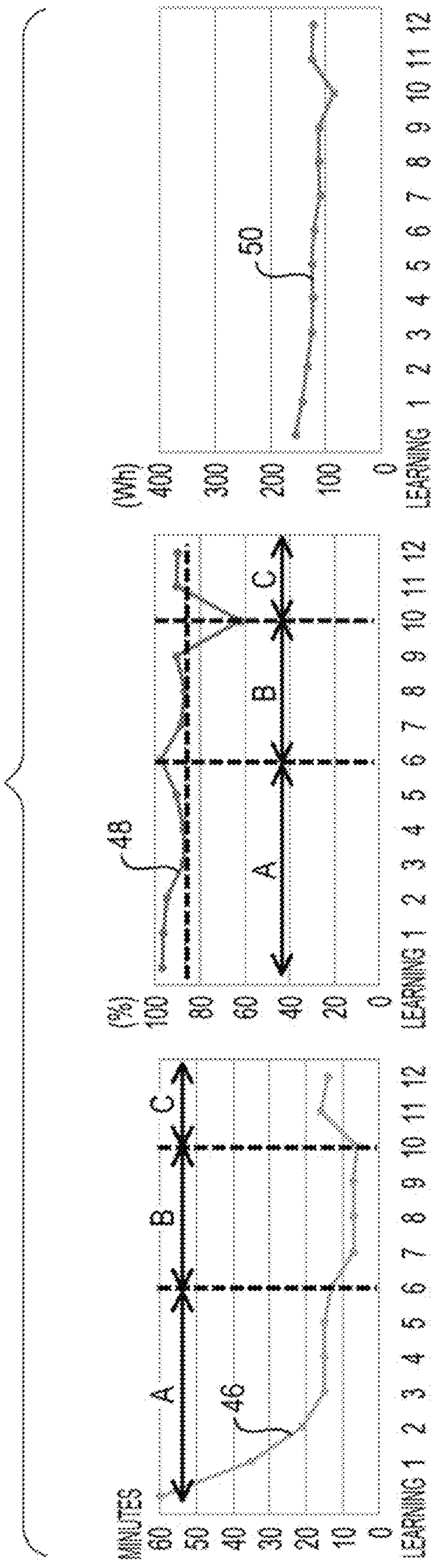
FIG. 8 is a diagram illustrating results of a third concrete example.

Referring to FIGS. 6 to 8, the results obtained through execution of the process according to the base configuration example described above will be described.

First Concrete Example

Referring to FIG. 6, a first concrete example will be described. FIG. 6 illustrates the change over time of the SP shift time, the change over time of ratios 1 and 2, and the change over time of the amount of power. The horizontal axis in each graph represents weeks. In the first concrete example, the image forming apparatus 10 is operated 40 times a day between 9:00 and 18:00.

Graph 32 illustrates the change over time of the SP shift time. Graph 34 illustrates the change over time of ratio 1. Graph 36 illustrates the change over time of ratio 2. Graph 38 illustrates the change over time of the amount of power other than the amount of power consumed in execution of jobs.

As illustrated in FIG. 6, use of ratio 1 enables control of shifting the mode of the image forming apparatus 10. In addition, while the ratio is maintained at the target value, reduction of the SP shift time is achieved. For example, the SP shift time is reduced to the range between14 minutes and 17 minutes with time. The ratio reflects convenience. As a shorter SP shift time is obtained, the mode of the image forming apparatus 10 is shifted to the SP mode at an earlier time point, achieving higher power saving. In the first concrete example, while the target convenience is maintained, power saving is improved. In addition, the amount of power other than the amount of power consumed in execution of jobs is reduced. Specifically, the amount of power is reduced by 22%.

Second Concrete Example

Referring to FIG. 7, a second concrete example will be described. FIG. 7 illustrates the change over time of the SP shift time (Graph 40), the change over time of ratio 1 (Graph 42), and the change over time of the amount of power (Graph 44). The horizontal axis in each graph represents weeks. In the second concrete example, the image forming apparatus 10 is operated 40 times per day between 9:00 and 14:00. In the second concrete example, the image forming apparatus 10 is used intensively in a period shorter than that in the first concrete example.

Also in the second concrete example, substantially the same effects as those in the first concrete example are obtained. In the second concrete example, the SP shift time is reduced to the range between 7 minutes and 8 minutes. The count of processes in the first concrete example is the same as that in the second concrete example. However, in the second concrete example, the image forming apparatus 10 is used intensively in a period shorter than that in the first concrete example. This way of using the image forming apparatus 10 is reflected in the shift time, and the shift time in the second concrete example is shorter than that in the first concrete example. In addition, the amount of power is reduced by 33%.

Third Concrete Example

Referring to FIG. 8, a third concrete example will be described. FIG. 8 illustrates the change over time of the SP shift time (Graph 46), the change over time of ratio 1 (Graph 48), and the change over time of the amount of power (Graph 50). The horizontal axis in each graph represents weeks.

In the third concrete example, the way of using the image forming apparatus 10 changes depending on periods. FIG. 8 illustrates Periods A, B, and C. Periods A and C are normal periods. In Period A, the image forming apparatus 10 is used 40 times per day. Period B is a busy period. In Period B, the image forming apparatus 10 is used 80 times per day.

In Period A, the SP shift time is stabilized in the range between15 minutes and 16 minutes. In Period B, the SP shift time is reduced to the range between 7 minutes and 8 minutes. In Period C, the SP shift time is stabilized in the range between 15 minutes and 16 minutes. Thus, the SP shift time is controlled so as to follow the way of using the image forming apparatus 10. In addition, the amount of power is reduced by 26%.

Modified Examples

Modified examples will be described below.

In the above-described base configuration example, ratio 1 or ratio 2 is used as a ratio, but these are merely exemplary ratios, and other ratios may be used. For example, ratio 3 or ratio 4 may be used:

$$LP/SP, \quad \text{ratio 3}$$

$$R/(R+LP+SP). \quad \text{ratio 4}$$

For example, ratio 4 may be used when a long time is set to the waiting time used at a return from the LP mode. When the LP shift time is controlled without change of the SP shift time, ratio 4 may be used.

When the ratio of the count of execution of jobs with a relatively short waiting time is relatively high, the processor 20 may calculate the ratio by using the count of execution of jobs performed through operations on the UI 14. When the ratio of the count of execution of jobs with a relatively short waiting time is relatively low, the processor 20 may calculate the ratio by using the count of execution of all jobs.

When the image forming apparatus 10 does not have the LP mode, the processor 20 may calculate the set value of the SP shift time by using ratio 5 described below, and the processor 20 controls the SP shift time:

$$R/(R+SP). \quad \text{ratio 5}$$

In the case where the image forming apparatus 10 has a fixing device, when the image forming apparatus 10 has a power saving mode of a fuser of the fixing device, ratio 6 described below may be used:

$$(R+F)/(R+F+SP), \quad \text{ratio 6}$$

where F represents the count of returns from the power saving mode of the fuser.

The processor 20 may calculate the ratio by using the count of execution of processes and the time intervals of execution of processes. Specifically, the processor 20 uses the count of processes, which are performed at time intervals which are each within a shift time (for example, the SP shift time), and the total count of processes to calculate ratio 7 described below. A time interval of execution of processes is a time interval from the time point of execution of a certain process till the time of execution of the next process. Use of ratio 7 eliminates necessity of counting processes in each mode. The total count of processes is the total count of processes performed in a learning period or in an automatic control period:

ratio 7: (count of processes performed at time intervals which are each within shift time)/total count of processes.

In the base configuration example and the modified examples described above, the count of processes performed in each mode may be the count of operations on the UI 14 in the mode. Each of R, LP, and SP described above is the count of operations on the UI 14. The processor 20 calculates a ratio (for example, any of ratios 1 to 7) on the basis of the count of operations on the UI 14 in each mode. Typically, when a user is to operate the UI 14, the user moves to the image forming apparatus 10 and operates the UI 14. Through calculation of a ratio based on the count of operations on the UI 14, the ratio is calculated in consideration of convenience in the state in which users, who are actually present at the image forming apparatus 10, operate the image forming apparatus 10. As a result, the set value of the shift time is calculated in consideration of convenience in such a state.

When the count of operations on the UI 14 is less than or equal to a threshold, the processor 20 may calculate a ratio, such as ratios 1 to 7, on the basis of the count including the count of processes (for example, jobs) other than operations on the UI 14. The threshold is a predetermined value. The threshold may be set by a user. For example, when the count of operations on the UI 14 is less than or equal to the threshold, the processor 20 calculates a ratio on the basis of the total of the count of execution of all jobs and the count of operations on the UI 14. That is, each of R, LP, and SP described above is the total of the count of execution of all jobs and the count of operations on the UI 14, and the processor 20 calculates the ratio on the basis of the total in each mode.

Count of Processes in Ready Mode

Assume the case in which a ratio (that is, ratio 1, 4, 5, or 6 described above) involving the count R of processes performed in the ready mode is used in the setting of a shift time to the power saving mode in the image forming apparatus 10.

In this case, if all the processes performed in the ready mode are counted, all the processes continuously requested by the same user on the UI 14 of the image forming apparatus 10 are added to the value of R. However, when a user goes to the image forming apparatus 10 and causes the image forming apparatus 10 to continuously perform multiple processes, only at the time of the first process among the processes, the user may have to wait due to a return from the power saving mode or the like. The second and subsequent processes do not cause the user to wait, resulting in no problem in convenience in view of waiting time. Therefore, if all the processes continuously requested by the same user are counted, the determined convenience may be higher than the user's actual impression (that is, a higher ratio). If the determined convenience is higher than the actual one, control is exerted so that lower convenience and higher power saving are obtained, that is, so that the shift time to the power saving mode is shortened. This makes the image forming apparatus 10 enter the power saving mode frequently. In other words, the probability is high that the image forming apparatus 10 is in the power saving mode when a user arrives at the image forming apparatus 10, resulting in a high probability of occurrence of the state in which the user has to wait.

The expression, "a process performed in X mode", (X is the name of the mode, for example, "ready", "LP", or "SP") indicates that the image forming apparatus 10 is in X mode at the time of occurrence of an event that has triggered the process. For example, assume that, when the image forming apparatus 10 is in the SP mode, a user goes to the image forming apparatus 10, presses the wake-up button to wake up the image forming apparatus 10, and then performs a copy operation. In this case, the trigger event, which is the pressing of the wake-up button, occurs in the SP mode. Therefore, the copy operation is a process preformed in the SP mode. As another example, assume the case in which a user is approaching the image forming apparatus 10 which is in the ready mode and which is not being operated by any user. In this case, a human detecting sensor 52 detects the user. However, since the image forming apparatus 10 is in the ready mode at that time, a return from the power saving mode is not performed. Then, assume that the user operates the UI 14 of the image forming apparatus 10 to download a document from a server and print the document. In this case, the event serving as a trigger is the printing through a UI operation, and the mode at the time of occurrence of the event is the ready mode. Therefore, the download printing is a process performed in the ready mode.

In order to cope with such cases, in the present exemplary embodiment, the count process is optimized compared with the method of counting all the processes performed in the ready mode. That is, in the present exemplary embodiment, only the first process of processes continuously requested by the same user is counted. In the description below, exemplary apparatus configuration and procedure for such count control will be described.

Figure 9:
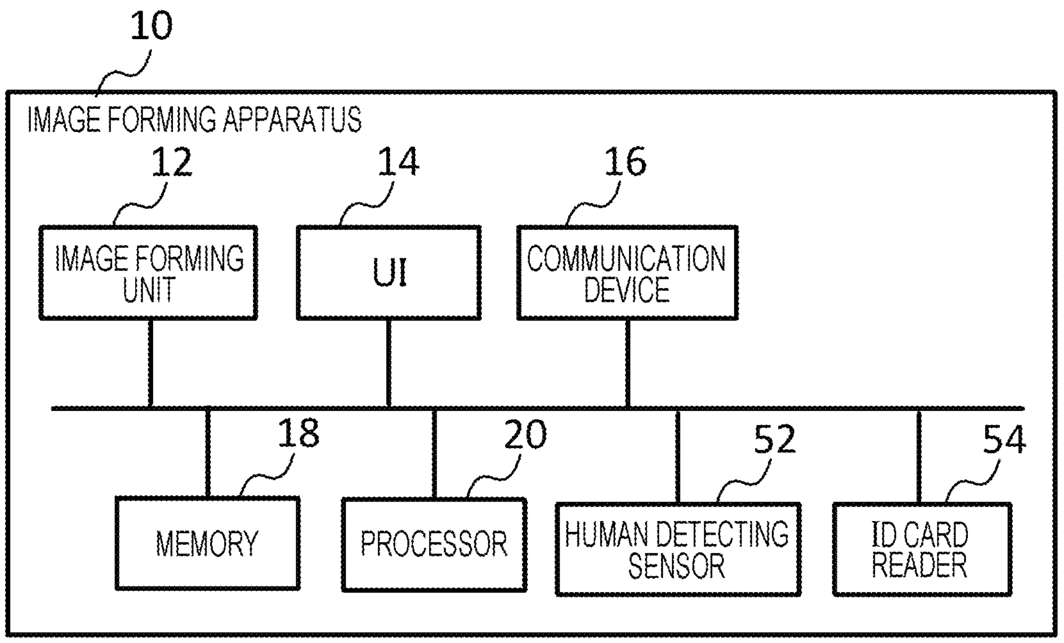
FIG. 9 is a block diagram illustrating the hardware configuration of an image forming apparatus according to an exemplary embodiment.

FIG. 9 illustrates the hardware configuration of the image forming apparatus 10 according to this exemplary embodiment. The image forming apparatus 10 illustrated in FIG. 9 has the configuration of the image forming apparatus 10 of the base configuration example, illustrated in FIG. 1, plus the human detecting sensor 52 and an identification (ID) card reader 54.

The human detecting sensor 52 is a sensor that detects presence of an object (typically, a person) within a predetermined detection range near the image forming apparatus 10. For example, when viewed from above, the detection range of the human detecting sensor 52 is a substantially fan-shaped area extending from the installation site of the human detecting sensor 52 of the image forming apparatus 10.

The type of sensor used as the human detecting sensor 52 is not particularly limited. For example, any sensor such as a pyroelectric sensor, a photoelectric sensor of a reflection type or the like, or various distance sensors (for example, sensors using laser, millimeter waves, ultrasonic waves, and the like) may be used. The distance sensor used for the human detecting sensor 52 may have a camera function capable of capturing an image. Alternatively, the human detecting sensor 52 may incorporate a camera. In addition, the human detecting sensor 52 may be a sensor that is a combination of multiple types of sensors enabling presence of a person to be detected in each of the detection ranges (for example, an area closest to the image forming apparatus 10 and an area outside the closest region). In addition, when a distance sensor is used, presence of a person may be detected in each of multiple detection ranges, which have been set, by using a single sensor.

The human detecting sensor 52 is typically disposed on the housing of the main body (that is, a part including a printing mechanism and the like) of the image forming apparatus 10, but is not necessarily disposed on the housing. For example, the human detecting sensor 52 may be disposed on the ceiling, a wall, or the floor of a room in which the image forming apparatus 10 is installed. In either case, the human detecting sensor 52 may be capable of detecting presence of a person within a detection range which is set with reference to the front surface of the image forming apparatus 10 (that is, the surface on which the UI 14 or the like is disposed).

The ID card reader 54 is a device that reads an ID card (that is, an identification card such as an employee ID card) carried by a user. For example, the ID card holds identification information, for example, the ID number of a user in a specific format, such as electronic information, magnetic information, or image information such as a barcode. The ID card reader 54 reads identification information held by an ID card by using a method corresponding to the data holding format of the ID card that is to be handled. The ID card reader 54 is an exemplary authentication apparatus that authenticates a user who is going to operate the image forming apparatus 10.

Count Control

The image forming apparatus 10 counts execution of processes in each mode in order to set the shift time for the power saving mode in accordance with the usage of the image forming apparatus 10. Exemplary control of counting execution of processes in each mode in the present exemplary embodiment will be described below.

In this control, multiple continuous processes requested by the same user from the UI 14 are counted as a count for the mode of the first process. The second and subsequent processes are not counted. Even in processes continuously performed starting from the first process, the first process of the processes requested by a second user different from the user is counted.

Exemplary procedure of the count control will be described below by referring to FIGS. 10 and 11. This procedure is repeatedly performed, for example, periodically.

In this procedure, the processor 20 determines whether the current mode of the image forming apparatus 10 is the SP mode (S10). If the result of this determination is Yes, the processor 20 determines whether the image forming apparatus 10 has returned from the SP mode to the ready mode through a user's apparatus-local operation (S12). The apparatus-local operation in S12 is an operation in which a user requests a return from the power saving mode by using the input device included in the image forming apparatus 10. An example of such an operation is pressing of a button for requesting a return from the power saving mode. In addition, a user's action of approaching the image forming apparatus 10 is also an example of such an operation. This is because, when the human detecting sensor 52 detects a user approaching the image forming apparatus 10, the image forming apparatus 10 returns to the ready mode if the mode at that time is the power saving mode.

If the determination result in S12 is No, the processor 20 determines whether the image forming apparatus 10 has returned from the SP mode due to a cause other than an apparatus-local operation (S14). A cause other than an apparatus-local operation, which may cause a return, may be, for example, an instruction to execute a job such as printing from a remote client apparatus over a network. If the determination result in S14 is No, the processor 20 returns to S12. Until the determination result in either S12 or S14 is Yes, S12 and S14 are repeatedly performed.

If the determination result in S14 is Yes, the image forming apparatus 10 performs the process (for example, a print job requested remotely) which is the cause of the return. In the case of a job such as remote printing, since no user is present in front of the apparatus, the process may be performed in the power-saving state with the UI 14 being turned off. The state, in which the UI 14 is turned off for power saving while the image forming apparatus 10 is ready for execution of a process such as printing, is referred to as "power saving with the UI turned off". In FIG. 10, the process is performed in the state of power saving with the UI turned off. When this process is completed, the processor 20 returns to S10 with the UI 14 turned off.

Figure 11:
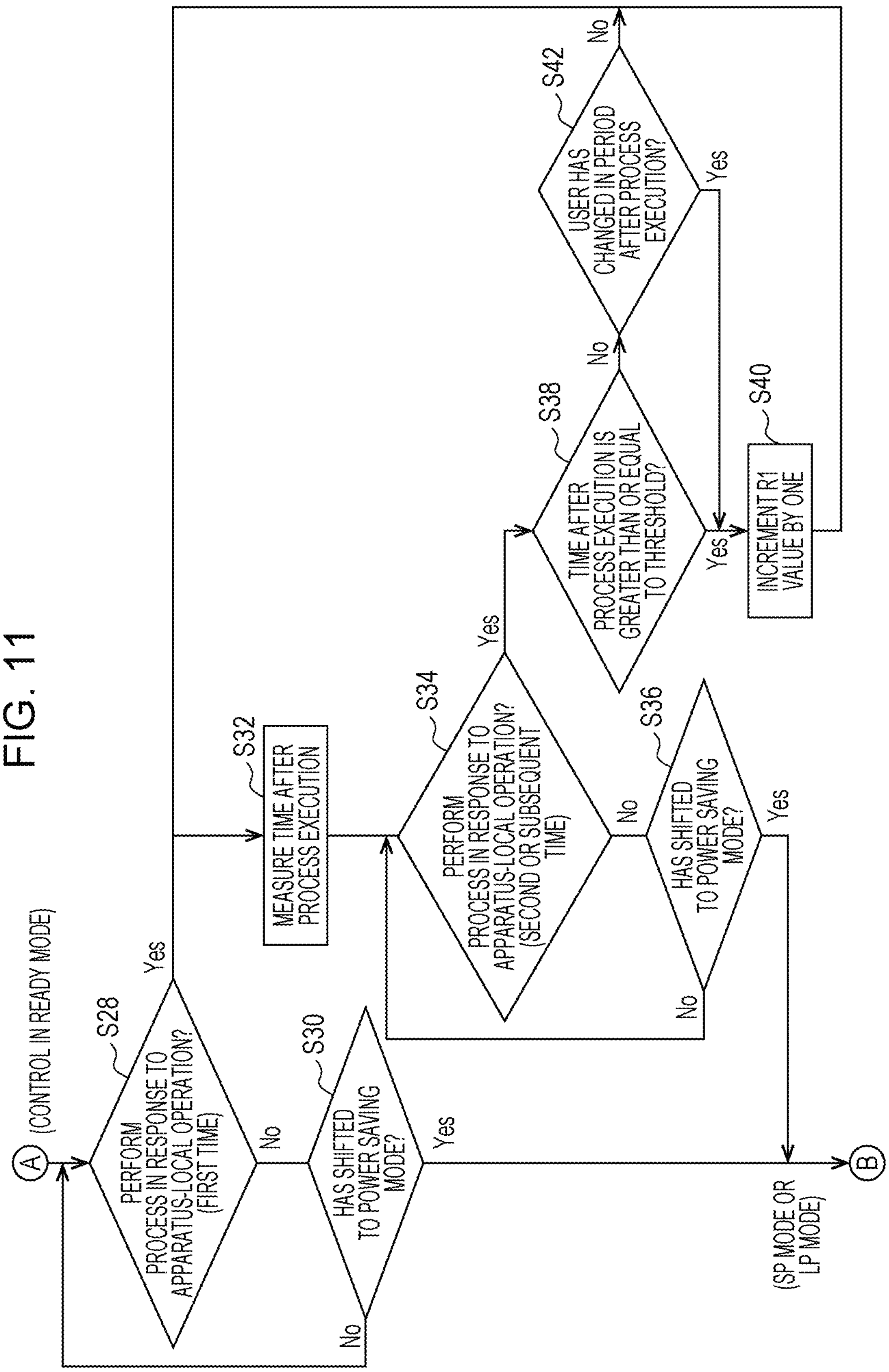
FIG. 11 is a diagram illustrating an example of the second half of the procedure of the count control in the exemplary embodiment.

If the determination result in S12 is Yes, the processor 20 increments the value of SP by one (S16), and proceeds to the procedure in FIG. 11. As described above, the value of SP is a variable that holds the count of processes performed in the SP mode. In parallel with S16, the image forming apparatus 10 shifts to the ready mode and performs the process requested by the user. The processor 20 proceeds to the procedure in FIG. 11.

If the determination result in S10 is No, the processor 20 determines whether the current mode of the image forming apparatus 10 is the LP mode or the above-described state of power saving with the UI turned off (S18). If the determination result in the S18 is No, the processor 20 proceeds to the procedure in FIG. 11.

If the determination result in S18 is Yes, the processor 20 determines whether the image forming apparatus 10 has returned from the LP mode to the ready mode through the user's apparatus-local operation (S20). The apparatus-local operation here is the same as in S12. If the determination result in S20 is No, the processor 20 determines whether the image forming apparatus 10 has shifted to the power saving mode (S22). The processor 20 performs the mode-shift control in parallel with the count control illustrated in FIGS. 10 and 11. In the mode-shift control, when the SP shift time elapses without a user's input to the UI 14, the processor 20 shifts the mode of the image forming apparatus 10 to the SP mode. When the image forming apparatus 10 is in the state of power saving with the UI turned off, the image forming apparatus 10 may shift to the LP mode or the SP mode in accordance with the setting of the power-saving shift time. If the determination result in S22 is Yes, the processor 20 returns to S10.

If the determination result in S22 is No, the processor 20 determines whether the image forming apparatus 10 has returned from the LP mode (or the power saving with the UI turned off) to the ready mode due to a cause other than an apparatus-local operation (for example, a job transmitted remotely) (S24). If the determination result in S24 is No, the processor 20 returns to S20. Until the determination result in S20, S22, or S24 is Yes, steps S20, S22, and S24 are repeatedly performed.

If the determination result in the S24 is Yes, the image forming apparatus 10 performs the process (for example, a job transmitted remotely) which is the cause of the return. In this case, in the example in FIG. 10, the image forming apparatus 10 performs the process in the state of power saving with the UI turned off. When this process is completed, the image forming apparatus 10 returns to S10 while remaining in the state of power saving with the UI turned off.

If the determination result in S20 is Yes, the processor 20 increments the value of LP by one (S26), and proceeds to the procedure in FIG. 11. As described above, the value of LP is a variable that holds the count of processes performed in the LP mode. In parallel with the S26, the image forming apparatus 10 shifts to the ready mode and performs the process requested by the user. The processor 20 proceeds to the procedure in FIG. 11.

Next, the procedure illustrated in FIG. 11 will be described. As can be seen from the cases of entering the procedure in FIG. 11 from the procedure in FIG. 10, the image forming apparatus 10 is in the ready mode at the time of entering the procedure in FIG. 11.

In the procedure in FIG. 11, first, the processor 20 determines whether the image forming apparatus 10 has performed a process in response to the apparatus-local operation (S28). For example, when a job, such as copying or scanning, is executed in response to an operation on the UI 14, the determination result in S28 is Yes. If the determination result in S28 is No, the processor 20 determines whether the image forming apparatus 10 has shifted to the power saving mode (S30). If the determination result in S30 is No, the processor 20 returns to S28 and waits for an operation on the UI 14. If the determination result in S30 is Yes, the processor 20 returns to S10. At that time, the image forming apparatus 10 shifts from the ready mode to the LP mode. Depending on the shift time settings, the image forming apparatus 10 may shift to the SP mode.

If the determination result in S28 is Yes, the processor 20 starts measurement of a time after the process execution (S32). A time after process execution is a time from when the image forming apparatus 10 completes execution of a process requested by a user to when the image forming apparatus 10 starts execution of the next process. For example, when execution of a copy job, which is requested by a user, is detected in S28, the processor 20 starts measurement of a time after the process execution, at the time point of completion of the copy job.

After that, the processor 20 determines whether the image forming apparatus 10 has performed a process in response to an apparatus-local operation (S34). S28 is a step of detecting the first process after a return from the power saving mode to the ready mode. In contrast, S34 is a step of detecting the second and subsequent processes. If the determination result in S34 is No, the processor 20 determines whether the image forming apparatus 10 has shifted to the power saving mode (S36). If the determination result in S36 is No, the processor 20 returns to S34 and waits for an operation on the UI 14. If the determination result in S36 is Yes, the processor 20 returns to S10. At that time, the image forming apparatus 10 shifts from the ready mode to the LP mode. Depending on the shift time settings, the image forming apparatus 10 may shift to the SP mode.

If the determination result in S34 is Yes, the processor 20 determines whether the time after process execution is greater than or equal to a threshold (S38). This determination is made to determine whether the process detected in S34 is performed "continuously" after the immediately previous process. The threshold used in the determination in S38 is, for example, a value of about one minute. The threshold may be set or changed in consideration of the usage of the image forming apparatus 10. If the determination result in S38 is No, that is, if the time after process execution is less than the threshold, it is determined that the current process (that is, the process detected in S34) is continuously performed after the immediately previous process.

In contrast, if the determination result in S38 is Yes, it is determined that the current process is not performed continuously after the immediately previous process. In this case, the current process is performed after a certain amount of time interval from the immediately previous process. An example of the case in which the determination result in the S38 is Yes is the following case: a user requests the immediately previous process; leaves the image forming apparatus 10 and returns to their seat; does desk work for a while; and then goes to the image forming apparatus 10 again and requests the current process. In the case where the image forming apparatus 10 is a high-speed electrophotographic device, the time required for a return from the LP mode to the ready mode is long to some extent. One reason for this is that it takes a longer time for the fixing device to return from the power saving mode in a high-speed device than in a small device. The time required for a return from the SP mode is even longer. In a commercial printing environment in which a high-speed device is often used, the waiting time for a return from the LP mode often degrades operational efficiency, and hence the LP shift time is often set to be longer. Therefore, the ready mode often continues until a user goes to the image forming apparatus 10 again after the user once leaves the image forming apparatus 10.

If the determination result in S38 is Yes, the processor 20 increments the value of a variable R1 by one (S40). The variable R1 is used instead of the above-described variable R as the count of processes performed in the ready mode. The count represented by the variable R is obtained by counting all the processes performed in the ready mode, whereas the variable R1 is used for counting only the first process of multiple continuous processes requested by the same user. The determination result in the S38, which is Yes, means that the current process is not continuously performed after the immediately previous process. Thus, the current process is counted in R1 regardless of who requested the current process. For example, assume the case in which a user, who has once left the image forming apparatus 10, goes to the image forming apparatus 10 again after a sufficient time (that is, greater than or equal to the threshold) has elapsed. In this case, the user will not feel inconvenient if the user hardly waits before the image forming apparatus 10 is ready for use. After S40, the processor 20 returns to S32.

If the determination result in S38 is No, the processor 20 determines whether the user who operates the image forming apparatus 10 has changed between completion of the immediately preceding process and start of the current process (S42).

The determination in S42 is performed, for example, based on the signal from the human detecting sensor 52. For example, assume that the human detecting sensor 52 has a function of capturing an image with a resolution capable of identifying a human face. In this example, the processor 20 sequentially recognizes the faces of users operating the image forming apparatus 10 (or users approaching the image forming apparatus 10) from images captured by the human detecting sensor 52. The processor 20 determines whether the face of a user recognized during the current process is of the same person as the face recognized during the immediately previous process, by using a known method. Then, if the determination result is No, in S42, the processor 20 determines that the user has changed in the time after process execution (that is, the determination result is Yes). In contrast, as a result of the face recognition, if it is determined that the user who requested the current process is the same person as the user who requested the immediately previous process, the processor 20 sets the determination result in the S42 to No.

In another example, assume that the human detecting sensor 52 is capable of measuring the distance of an object (for example, a user) within the detection range. In this example, the processor 20 has a function of recognizing the state in which a user is moving away from the image forming apparatus 10, on the basis of the signal of the human detecting sensor 52. That is, the processor 20 recognizes the state in which the distance to a user, which is detected by the human detecting sensor 52, gradually increases from a small value indicating that the user is just in front of the UI 14. In addition, the processor 20 has a function of recognizing the state in which a user is approaching the image forming apparatus 10, that is, the state in which the above-described distance gradually decreases and finally reaches the above-described small value, from the signal of the human detecting sensor 52. The processor 20 makes determination in the S42 by using these functions. That is, if the processor 20 determines that a user has moved away from the image forming apparatus 10 after execution of the immediately previous process and then another user has approached the image forming apparatus 10 by the time of execution of the current process, the processor 20 determines that the user has changed, in S42. In contrast, if it is found, from the signal of the human detecting sensor 52, that a user is continuously present in front of the image forming apparatus 10 even after the immediately previous process, the processor 20 determines that the user has not changed, in S42.

In still another example, the processor 20 may make determination in S42 in accordance with a reading result of the ID card reader 54. That is, in this example, a user is allowed to use the image forming apparatus 10 by causing the ID card reader 54 to read the ID card. If the IDs (that is, identification information) of the users read by the ID card reader 54 in the immediately previous process and the current process are different from each other, the processor 20 determines that the user has changed, in S42. In contrast, if the user authentication performed by reading the ID card in the immediately previous process is still valid in the current process, the determination result in S42 is No.

If it is determined that the user has changed in S42 (that is, the determination result is Yes), the processor 20 increments the value of the variable R1 by one (S40). For example, assume the case in which a user, who has used the image forming apparatus 10, leaves the image forming apparatus 10 after using the image forming apparatus 10, and a different user, who has been waiting for their turn in the vicinity of the image forming apparatus 10, immediately goes to the image forming apparatus 10 and starts using the image forming apparatus 10. In this case, the determination result in S42 is Yes. In this case, the fact that the image forming apparatus 10 is in the ready mode at the time when the different user tries to use the image forming apparatus 10 and that the user can immediately use the image forming apparatus 10 is important as information about convenience in view of the entire user group. Thus, the process is counted in R1. After S40, the processor 20 returns to S32.

If the determination result in S42 is No, the processor 20 skips S40 (that is, does not increment R1) and returns to S32. In this case, the current process is requested by the same user as the immediately previous process, and is performed continuously after the immediately previous process. In this way, since it is normal for a user not to wait for a return from the power saving mode at the time point of a subsequent process (that is, the current process), the process is not used in the determination about convenience.

An exemplary procedure of the count control has been described above. Next, an example of counting according to the procedure will be described by referring to FIG. 12.

In FIG. 12, the records of the first job (denoted as "NO1" in FIG. 12) to the twelfth job are arranged in the order of execution of the jobs.

Among the items included in each job record, the item, "return from SP before job", takes a value of "1" in the case of a return from the SP mode to the ready mode before start of the job, and takes an empty value in the other case. If the value of this item is "1", the job is counted in the value of SP. This corresponds to the following case: in the procedure in FIG. 10, the determination result in S10 is Yes; the determination result in S12, which is the next step, is Yes; the value of the SP is incremented by one in S16.

The item, "return from LP before job", takes a value of "1" in the case of a return from the LP mode to the ready mode before start of the job, and takes an empty value in the other case. If the value of this item is "1", the job is counted in the value of LP. This corresponds to the following case: in the procedure in FIG. 10, the determination result of S18 is Yes; the determination result in S20, which is the next step, is Yes; the value of LP is incremented by one in S26.

The item, "ready mode before job", takes a value of "1" in the case where the mode is the ready mode before start of the job, and takes an empty value in the other case. This corresponds to the following case: the determination result in S34 is Yes in the procedure in FIG. 11.

The item, "job description", indicates the type of the job. In the example, "copy", "scan", and "print from server" are illustrated as the "job description". "Print from server" is a job of printing a document through access to a server on a network from the UI 14 of the image forming apparatus 10 and download of the document on the server to the image forming apparatus 10.

The item, "time interval after completion of job", indicates a measurement value of the above-described time after process execution, that is, the time from the end time point of the immediately previous job to start of the job (see S32 in FIG. 11).

The item, "change of user within threshold time after completion of job", indicates whether change of the user, who operates the image forming apparatus 10, is detected until the threshold time elapses from the end time point of the job.

The item, "R1 value count", takes a value of "1" when the job is counted in the value of R1 (S40 in FIG. 11), and takes an empty value when the job is not counted in the value of R1.

The case illustrated in FIG. 12 will be described below in time series. In this case, the LP shift time is 15 minutes, and the SP shift time is even longer. Further, it is assumed that the threshold used in the determination in S38 is one minute.

Just before this case starts, the image forming apparatus 10 is in the SP mode. A certain user returns the image forming apparatus 10 to the ready mode in this state and requests execution of a copy job of the job number NO1. In this case, this job is counted in the value of SP. It is assumed that the identification information of this user is "user A".

The execution of the job NO2 is requested 15 seconds after completion of the job NO1. Since the LP shift time has not elapsed at the time of this request, the image forming apparatus 10 remains in the ready mode. In addition, the processor 20 determines that the user, who operates the image forming apparatus 10, has not changed in the time of 15 seconds, from the signal of the human detecting sensor 52 or the like. In this case, the processor 20 does not count the job NO2 in the value of R1 (of course, counts it in neither SP nor LP).

Each of the jobs NO3 and NO4, which are subsequent to the job NO2, is requested within one minute from completion of its immediately previous job, and the user, who requests the jobs, does not change. Therefore, the jobs are not counted in the value of R1.

The job NO5 is requested by "user A" five minutes after completion of the job NO4. Immediately before this request, the image forming apparatus 10 remains in the ready mode. However, at the time point of the request for the job NO5, one minute, which is the threshold time, has elapsed after completion of the immediately previous job NO4, and therefore, the determination result in the S38 is Yes. Therefore, in S40, the processor 20 counts the job NO5 in R1.

The job NO6 is requested at the time point of 30 seconds after completion of the job NO5, and change of the user is not detected in the time of 30 seconds. Therefore, the job NO6 is not counted in any mode.

Since the job NO7 is requested at the time point of 50 seconds after completion of the job NO6, the determination result in S38 is No. In contrast, since it is detected that the user, who operates the image forming apparatus 10, has changed in the time of 50 seconds, the determination result in the S42 is Yes. As a result, in S40, the job NO7 is counted in R1.

The job NO8 is requested 10 minutes after completion of the job NO7. At this time point, the LP shift time (=15 minutes) has not elapsed since completion of the immediately previous job NO7, and thus the image forming apparatus 10 remains in the ready mode. However, at the time point when the job NO8 is requested, one minute, which is the threshold time, has elapsed since completion of the immediately previous job NO7, and therefore the determination result in the S38 is Yes. Therefore, in S40, the processor 20 counts the job NO8 in the R1.

The job NO9 is requested at the time point of 30 seconds after completion of the job NO8, and change of the user is not detected in the time of 30 seconds. Therefore, the job NO9 is not counted in any mode.

After completion of the job NO9, the image forming apparatus 10 does not perform any process during the LP shift time (=15 minutes), and as a result, a shift to the LP mode occurs. After the shift, a certain user (assumed to be "user D") goes to the image forming apparatus 10 and operates the UI 14 to request execution of the job NO10. The processor 20 counts this job in the value of LP (S26 in FIG. 10).

The job NO11 is requested at the time point of 15 seconds after completion of the job NO10, and change of the user is not detected in the time of 15 seconds. Therefore, the job NO11 is not counted in any mode.

Since the job NO12 is requested at the time point of 40 seconds after completion of the job NO11, the determination result in S38 is No. In contrast, since it is detected that the user, who operates the image forming apparatus 10, has changed in the time of 40 seconds, the determination result in the S42 is Yes. As a result, in S40, the job NO12 is counted in R1.

Setting Shift Times

Figure 10:
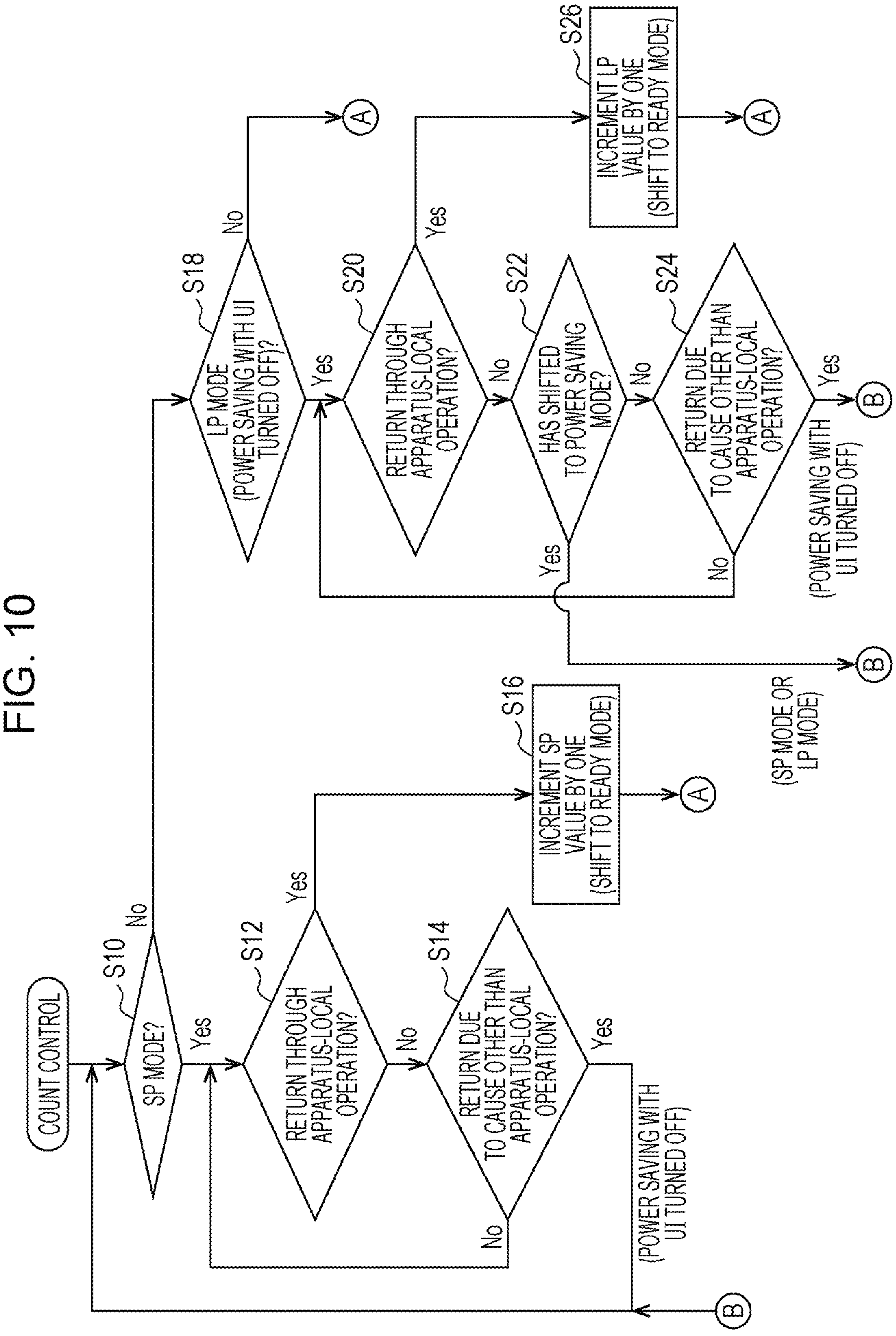
FIG. 10 is a diagram illustrating an example of the first half of the procedure of count control in an exemplary embodiment.

The processor 20 performs the procedure illustrated in FIGS. 10 and 11 for a predetermined unit period (for example, one week) to obtain the count of execution of processes in each mode in the unit period. Then, the SP shift time and the LP shift time are set on the basis of the result of the counts. An example of this setting procedure is illustrated in FIG. 13.

Figure 13:
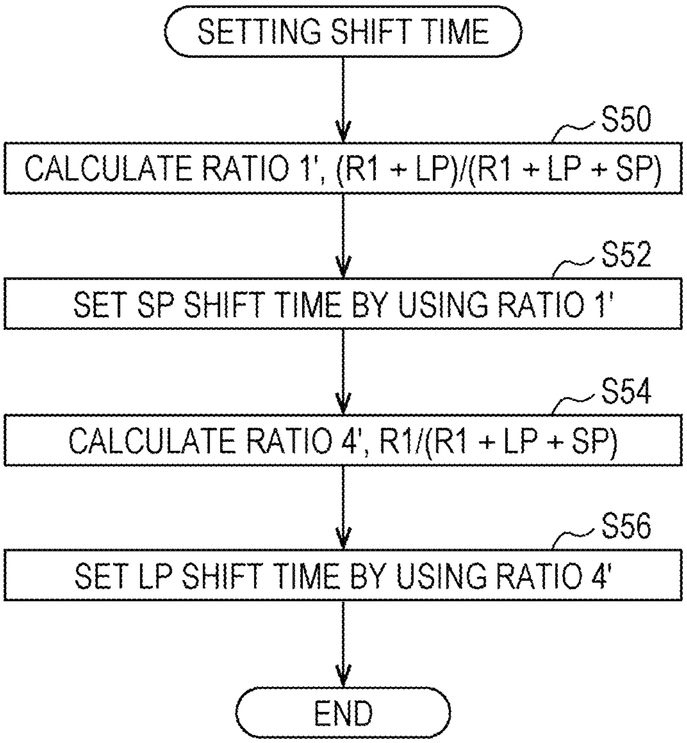
FIG. 13 is a diagram illustrating an exemplary procedure of setting shift times.

In the example in FIG. 13, the processor 20 first acquires the values of the process counts R1, LP, and SP in the respective modes, which are obtained by counting for a predetermined period with use of the count control. The processor 20 calculates ratio 1' (S50) according to the following expression:

$$(R1+LP)/(R1+LP+SP). \qquad \text{ratio } 1'$$

Ratio 1' is obtained by replacing R in ratio 1, which is described above, with R1.

Next, the processor 20 sets the SP shift time by using ratio 1' (S52). This setting may be performed by using the method described in the description about the learning step and the automatic control step. That is, the target value is determined according to ratio 1'; λ is calculated according to Expression (7) or (9); and the set value of the SP shift time is calculated according to Expression (8) or (10). The processor 20 sets the set value of the SP shift time, which is calculated in this way, to the image forming apparatus 10.

The processor 20 also calculates ratio 4' (S54) according to the following expression:

$$R1/(R1+LP+SP). \qquad \text{ratio } 4'$$

Ratio 4' is obtained by replacing R in ratio 4 with R1.

Next, the processor 20 sets the LP shift time by using ratio 4' (S56). This setting may be performed in the same manner as in S52. That is, A is calculated according to Expression (7) or (9), and a set value of the LP shift time is calculated according to Expression (8) or (10) (where "SP shift time" in the expression is replaced by "LP shift time"). The processor 20 sets the set value of the LP shift time, which is calculated in this way, to the image forming apparatus 10.

In these calculations, R in Expressions (7) and (9) may be replaced by R1.

After setting the respective shift times in S52 and S54, the processor 20 may perform the compensation of the set values or the branch process based on the set values.

The reason why ratio 1' is used for setting the SP shift time and ratio 4' is used for setting the LP shift time in the procedure illustrated in FIG. 13 is as follows.

In the case where the image forming apparatus 10 is a high-speed electrophotographic device, a certain amount of time is required to wake up the fixing device that has entered the power saving state in the LP mode as described above. Therefore, the waiting time of a user when the image forming apparatus 10 is in the LP mode is significantly longer than the waiting time when the image forming apparatus 10 is in the ready mode. As a matter of course, the waiting time of the SP mode is longer than the waiting time of the LP mode, but the waiting time of the LP mode is remarkably longer than the waiting time of the ready mode, which is a feature of a high-speed device in comparison with a medium-to-low-speed device.

In contrast, when the image forming apparatus 10 is a medium-speed or low-speed electrophotographic device, the fixing device's return from the power saving state is very quick. Therefore, the waiting time of a user when the image forming apparatus 10 is in the LP mode is almost the same as the waiting time when the image forming apparatus 10 is in the ready mode.

Accordingly, in the case of a high-speed device, it is highly important to appropriately set the LP shift time. In addition, in the case of a high-speed device, the ready mode is the only mode which is highly convenient, that is, which has a short waiting time for a return from the power saving mode. Therefore, it is appropriate to use ratio 4', which uses only the process count R1 in the ready mode as the numerator, as a ratio serving as an index value of convenience based on which the target value is determined. Therefore, in S54 and S56, ratio 4' is calculated and the LP shift time is set by using ratio 4'.

Further, a medium-to-low-speed device may provide high convenience in the ready mode and the LP mode. Therefore, it is appropriate to use ratio 1', in which the numerator is the sum of the process count R1 in the ready mode and the process count in the LP mode, as a ratio serving as an index value of convenience based on which the target value is determined. Therefore, in S50 and S52, ratio 1' is calculated and the SP shift time is set by using ratio 1'.

As can be seen from the above description, the procedure in FIG. 13 is applicable to both a high-speed device and a medium-to-low-speed device. The procedure in FIG. 13 is merely an example. Other procedures may be used. For example, the procedure for a high-speed device may be a procedure in which a predetermined fixed value is used as the SP shift time and in which the LP shift time is set according to S54 and S56. Further, the procedure for a medium-to-low-speed device may be a procedure in which a predetermined fixed value is used as the LP shift time and in which the SP shift time is set according to S50 and S52.

In the above description, the example in which there are two modes of LP and SP as the power saving mode is mainly described, but there may be only one power saving mode. In this case, a value obtained by replacing R of ratio 5 with R1 may be calculated; the target value may be determined on the basis of the calculation result; and the shift time to the power saving mode may be set on the basis of the target value.

Figure 14:
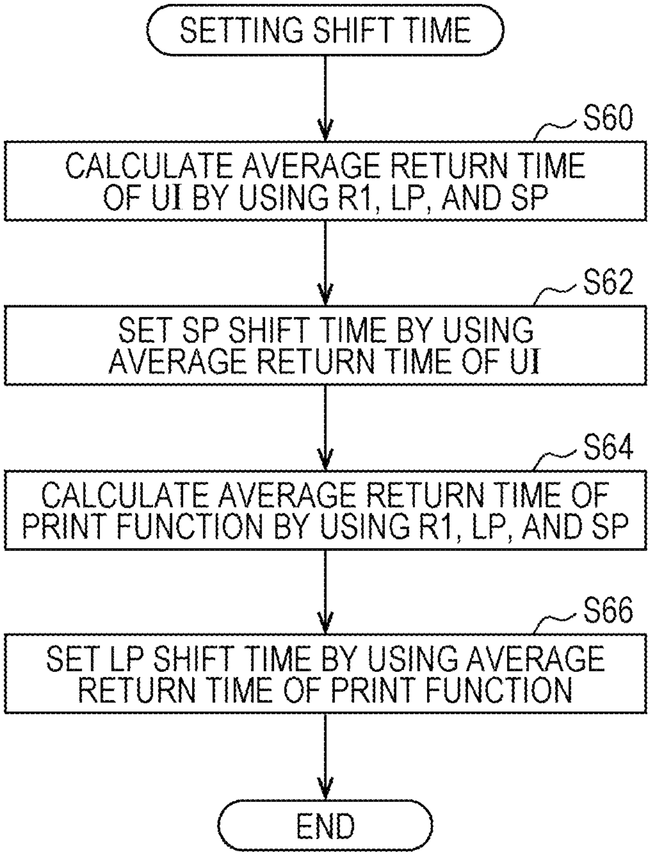
FIG. 14 is a diagram illustrating another exemplary procedure of setting shift times.

Next, referring to FIG. 14, another example of the procedure of setting the shift times will be described. In the example described above, the ratio of the count of processes performed in a mode, which has high convenient, with respect to the total of processes performed by the image forming apparatus 10 is used as the index value of convenience, and an appropriate shift time is obtained. In contrast, in this example, similarly to the method disclosed in Japanese Unexamined Patent Application Publication No. 2023-142619, the average return time is used as the index value of convenience, and the shift times are calculated.

That is, in this example, the processor 20 calculates the average return time of the UI 14 by using the values of R1, LP, and SP which are obtained by counting over a predetermined time through the above-described count control (S60). This calculation is performed, for example, according to the following expression:

$$\begin{aligned}(\text{average return time of } UI\ 14) = \\ \{(\text{return time of } UI\ 14 \text{ in ready mode}) \times R1 + \\ (\text{return time of } UI\ 14 \text{ in } LP \text{ mode}) \times LP + \\ (\text{return time of } UI\ 14 \text{ in } SP \text{ mode}) \times SP\}/(R1+LP+SP).\end{aligned}$$

Here, the return time of the UI 14 in each power saving mode is a time from when the image forming apparatus 10 in the power saving mode starts returning from the power saving mode to when the UI 14 is ready for receiving an input. The return time is an exemplary first waiting time from when a process trigger occurs to when a process condition is ready to be input to the image forming apparatus 10. In this case, examples of the process trigger include pressing of a wake-up button, which is for giving an instruction to return from the power saving mode, and detection of a user by the human detecting sensor 52. The UI 14 is used to input conditions (for example, a paper size and the number of copies) of a process that is to be performed by a user.

In the ready mode, the UI 14 is already ready for receiving an input, and thus the UI return time in this mode is zero. The UI return time in the LP mode is a low value close to zero, for example, one second. The UI return time in the SP mode is longer, and is, for example, three seconds.

Next, the processor 20 sets the SP shift time by using the average return time of the UI 14 (S62). In this step, the processor 20 compares the current target value of the return time of the UI 14 with the average return time. If the result of this comparison indicates that the average return time is shorter, it means that the target convenience is satisfied. Therefore, the processor 20 changes the SP shift time to a value less than the current set value. A shorter SP shift time causes a shift to the SP mode to occur frequently, resulting in a longer return time of UI 14 but achieving improvement of power saving. In contrast, if the average return time is longer, the processor 20 makes the SP shift time greater than the current set value. The change amount of the SP shift time may be determined in accordance with the difference between the target value and the average return time, that is, (target value-average return time). For example, if the average return time is shorter, the reduction of the SP shift time is increased as (target value-average return time) is greater.

The reason why the SP shift time is set based on the average return time of the UI 14 is the same as the reason why the SP shift time is set from ratio 1', in which (R1+LP) is used as the numerator, in S52 of the procedure of FIG. 13.

In addition, the processor 20 calculates the average return time of the print function by using the values of R1, LP, and SP (S64). This calculation is performed, for example, according to the following expression:

$$(\text{average return time of print function}) = \{(\text{return time of print function in ready mode}) \times R1 + (\text{return time of print function in } LP \text{ mode}) \times LP + (\text{return time of print function in } SP \text{ mode}) \times SP\}/(R1 + LP + SP).$$

Here, the return time of the print function in each power saving mode is a time from when the image forming apparatus 10 in the mode starts returning from the power saving mode to when printing is ready to be performed. The return time of the print function is an exemplary second waiting time from when a process trigger occurs to when the image forming apparatus 10 is ready to perform a process.

Since the image forming apparatus 10 in the ready mode is already ready to perform printing, the return time of the print function in this mode is zero. The return time of the print function in the LP mode is a time required for, in the LP mode, waking up the fixing device which is in the power saving state, and is, for example, three seconds. In the SP mode, in addition to the fixing device, the developing device, the sheet conveying mechanism, and the like are in the power saving state. Therefore, the return time of the print function from the SP mode is longer, and is, for example, five seconds. This numerical value is merely an example, and the return time of the print function varies to a large extent mainly depending on the type of the fixing device.

Next, the processor 20 sets the LP shift time by using the average return time of the print function (S66). In this step, the processor 20 compares the current target value of the return time of the print function with the average return time. If the result of this comparison indicates that the average return time is shorter, the processor 20 changes the LP shift time to a value less than the current set value. In contrast, if the average return time is longer, the processor 20 makes the LP shift time greater than the current set value. The change amount of the LP shift time may be determined in accordance with the difference between the target value and the average return time, that is, (target value-average return time). For example, in the case where the average return time is longer, the LP shift time is made longer as (average return time-target value) is greater.

The reason why the LP shift time is set based on the average return time of the print function is the same as the reason why the LP shift time is set from ratio 4', in which only the process count R1 in the ready mode is used as the numerator, in S56 in the procedure in FIG. 13.

In the above description, the average of return times from the power saving mode, which are related to processes having been performed, is used as the index value of convenience. However, another statistical representative value (for example, a median) other than the average may be used as the index value of convenience.

ON/OFF of Count Control

In the image forming apparatus 10, default values of the power-saving shift times, such as the LP shift time and the SP shift time, are set by a manufacturer. For example, if both the LP shift time and the SP shift time of the image forming apparatus 10 are set to default values, desired power saving may be obtained.

Therefore, if the SP shift time or the LP shift time has not been extended, the above-described count control and the setting control for the shift time based on the count control may be skipped. An example of control according to this policy is illustrated in FIG. 15.

Figure 15:
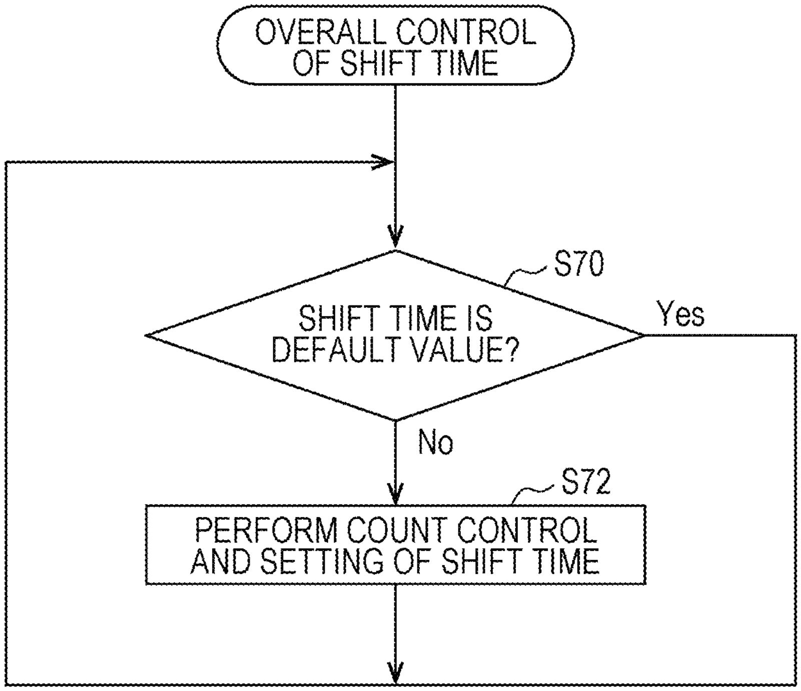

In the procedure in FIG. 15, the processor 20 checks the set values of the SP shift time and the LP shift time, and determines whether these set values are less than or equal to the respective default values (S70). If either one or both of the SP shift time and the LP shift time is greater than the default value, the determination result in S70 is No. This means that the SP shift time or the LP shift time has been extended. In this case, the processor 20 performs the above-described count control and the setting control for the shift time based on the count control (S72). In contrast, if the determination result in S70 is Yes, the processor 20 skips S72. In this case, the processor 20 performs shifting to the SP mode and the LP mode in accordance with the set values without changing the set values of the SP shift time and the LP shift time.

Some of the functions of the image forming apparatus 10 according to the base configuration example and the exemplary embodiment described above may be implemented by using an apparatus other than the image forming apparatus 10. When some functions of the image forming apparatus 10 are implemented by a different apparatus other than the image forming apparatus 10, the image forming apparatus 10 and the different apparatus may be included in an information processing system. That is, the functions of the image forming apparatus 10 may be implemented in a single apparatus, or may be implemented in the information processing system including multiple apparatuses.

For example, each function of the image forming apparatus 10 is implemented in cooperation with hardware and software. For example, the processor 20 of the image forming apparatus 10 reads, for execution, programs stored in a memory. Thus, each function of the image forming apparatus 10 is implemented. The programs are stored in a memory through a recording medium, such as a compact disc (CD) or a digital versatile disc (DVD), or through a communication path such as a network.

In the above-described exemplary embodiment, control of the mode of the image forming apparatus 10 has been described. However, the processes according to the exemplary embodiment and its modified examples may be applied to an apparatus other than the image forming apparatus 10. That is, an apparatus according to the exemplary embodiment and its modified examples may be other than the image forming apparatus 10 as long as the apparatus has multiple modes having different times elapsing until execution of a process is ready.

In the exemplary embodiments above, the term "processor" refers to hardware in a broad sense. Examples of the processor include general processors (e.g., CPU: Central Processing Unit) and dedicated processors (e.g., Epigraphic Processing Unit, ASIC: Application Specific Integrated Circuit, FPGA: Field Programmable Gate Array, and programmable logic device). In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

APPENDIX (((1)))

An information processing system comprising:

a processor for an apparatus having an executable mode and one or more types of power saving mode and setting a shift time from the executable mode to the power saving mode, the executable mode being a mode in which execution of a process is ready, the processor being configured to:

detect change of a user who operates the apparatus;

obtain an index value based on counts of execution of processes in the respective modes in the apparatus, and set the shift time based on the obtained index value; and in the setting, count, as a single process, a plurality of processes in the count for the mode in which the first process of the plurality of processes is performed, the plurality of processes being performed continuously in a state in which the change is not detected.

(((2)))

The information processing system according to (((1))), wherein the index value is a ratio of the count of execution of processes in the executable mode with respect to a total count of execution of processes in the executable mode and the one or more types of power saving mode.

(((3)))

The information processing system according to (((1))), wherein the one or more types of power saving mode include a first power saving mode and a second power saving mode, the second power saving mode being a mode in which a time required for a return to the executable mode is longer than in the first power saving mode, and wherein, in the setting, the processor is configured to set a shift time from the executable mode to the second power saving mode by using (R1+LP)/(R1+LP+SP) as the index value, where R1 represents the count of execution of processes in the executable mode, LP represents the count of execution of processes in the first power saving mode, and SP represents the count of execution of processes in the second power saving mode.

(((4)))

The system according to (((3))), wherein, in the setting, the processor is further configured to set a shift time from the executable mode to the first power saving mode by using R1/(R1+LP+SP) as a second index value.

(((5)))

The information processing system according to (((1))), wherein, in the setting, the processor is configured to:

obtain a representative value, for all the modes, of a waiting time from when a trigger which is a process occurs to when execution of the process is ready, the representative value being obtained based on the counts of execution of processes in the respective modes in the apparatus; and set the shift time by using the obtained representative value as the index value.

(((6)))

The information processing system according to (((5))), wherein the one or more types of power saving mode include a first power saving mode and a second power saving mode, the second power saving mode being a mode in which a time required for a return to the executable mode is longer than in the first power saving mode, wherein the waiting time is a first waiting time from when the trigger occurs to when a process condition is ready to be input to the apparatus, and wherein, in the setting, the processor is configured to set a shift time from the executable mode to the second power saving mode by using, as the index value, the representative value, for all the modes, of the first waiting time.

(((7)))

The information processing system according to (((6)), wherein, in the setting, the processor is further configured to set a shift time from the executable mode to the first power saving mode by using, as the index value, the representative value, for all the modes, of a second waiting time from when the trigger occurs to when the apparatus is ready to perform the process.

(((8)))

The information processing system according to (((1))), wherein the processor is configured to detect the change of the user who operates the apparatus, based on a detection result which is input from a human detecting sensor that detects a user near the apparatus.

(((9)))

The information processing system according to (((8))), wherein the human detecting sensor includes a camera, and wherein the processor is configured to recognize a face of a person near the apparatus to detect the change of the user who operates the apparatus, the face being photographed by using the camera.

(((10)))

The information processing system according to (((8))), wherein the processor is configured to detect the change of the user who operates the apparatus, when the human detecting sensor detects a user moving away from a vicinity of the apparatus and then detects a new user coming to the vicinity of the apparatus.

(((11)))

The information processing system according to (((1))), wherein the processor is configured to detect the change of the user who operates the apparatus, based on an authentication result of an authentication apparatus that authenticates a user who uses the apparatus.

(((12)))

The information processing system according to (((1))), wherein the processor is configured to determine continuous execution of a first process and a second process which is a next process of the first process, if, after completion of execution of the first process, the apparatus starts the second process within a predetermined time.

(((13)))

The information processing system according to (((1))), wherein a default value of the shift time is held in the apparatus, and wherein the processor is configured to perform the setting when a value of the shift time set in the apparatus is greater than the default value.

(((14)))

A program for causing a computer to execute a process comprising:

for an apparatus having an executable mode and one or more types of power saving mode and setting a shift time from the executable mode to the power saving mode, the executable mode being a mode in which execution of a process is ready, detecting change of a user who operates the apparatus;

obtaining an index value based on counts of execution of processes in the respective modes in the apparatus, and setting the shift time based on the obtained index value; and in the setting, counting, as a single process, a plurality of processes in the count for the mode in which the first process of the plurality of processes is performed, the plurality of processes being performed continuously in a state in which the change is not detected.

(((15)))

A method for an apparatus having an executable mode and one or more types of power saving mode and setting a shift time from the executable mode to the power saving mode, the executable mode being a mode in which execution of a process is ready, the method comprising:

detecting change of a user who operates the apparatus;

obtaining an index value based on counts of execution of processes in the respective modes in the apparatus, and setting the shift time based on the obtained index value; and in the setting, counting, as a single process, a plurality of processes in the count for the mode in which the first process of the plurality of processes is performed, the plurality of processes being performed continuously in a state in which the change is not detected.

What is claimed is:

1. An information processing system comprising:

a processor for an apparatus having an executable mode and one or more types of power saving mode and setting a shift time from the executable mode to the power saving mode, the executable mode being a mode in which execution of a process is ready, the processor being configured to:

detect change of a user who operates the apparatus;

obtain an index value based on counts of execution of processes in the respective modes in the apparatus, and set the shift time based on the obtained index value; and in the setting, count, as a single process, a plurality of processes in the count for the mode in which the first process of the plurality of processes is performed, the plurality of processes being performed continuously in a state in which the change is not detected.

2. The information processing system according to claim 1, wherein the index value is a ratio of the count of execution of processes in the executable mode with respect to a total count of execution of processes in the executable mode and the one or more types of power saving mode.

3. The information processing system according to claim 1, wherein the one or more types of power saving mode include a first power saving mode and a second power saving mode, the second power saving mode being a mode in which a time required for a return to the executable mode is longer than in the first power saving mode, and wherein, in the setting, the processor is configured to set a shift time from the executable mode to the second power saving mode by using (R1+LP)/(R1+LP+SP) as the index value, where R1 represents the count of execution of processes in the executable mode, LP represents the count of execution of processes in the first power saving mode, and SP represents the count of execution of processes in the second power saving mode.

4. The information processing system according to claim 3, wherein, in the setting, the processor is further configured to set a shift time from the executable mode to the first power saving mode by using R1/(R1+LP+SP) as a second index value.

5. The information processing system according to claim 1, wherein, in the setting, the processor is configured to:

obtain a representative value, for all the modes, of a waiting time from when a trigger which is a process occurs to when execution of the process is ready, the representative value being obtained based on the counts of execution of processes in the respective modes in the apparatus; and set the shift time by using the obtained representative value as the index value.

6. The information processing system according to claim 5, wherein the one or more types of power saving mode include a first power saving mode and a second power saving mode, the second power saving mode being a mode in which a time required for a return to the executable mode is longer than in the first power saving mode, wherein the waiting time is a first waiting time from when the trigger occurs to when a process condition is ready to be input to the apparatus, and wherein, in the setting, the processor is configured to set a shift time from the executable mode to the second power saving mode by using, as the index value, the representative value, for all the modes, of the first waiting time.

7. The information processing system according to claim 6, wherein, in the setting, the processor is further configured to set a shift time from the executable mode to the first power saving mode by using, as the index value, the representative value, for all the modes, of a second waiting time from when the trigger occurs to when the apparatus is ready to perform the process.

8. The information processing system according to claim 1, wherein the processor is configured to detect the change of the user who operates the apparatus, based on a detection result which is input from a human detecting sensor that detects a user near the apparatus.

9. The information processing system according to claim 8, wherein the human detecting sensor includes a camera, and wherein the processor is configured to recognize a face of a person near the apparatus to detect the change of the user who operates the apparatus, the face being photographed by using the camera.

10. The information processing system according to claim 8, wherein the processor is configured to detect the change of the user who operates the apparatus, when the human detecting sensor detects a user moving away from a vicinity of the apparatus and then detects a new user coming to the vicinity of the apparatus.

11. The information processing system according to claim 1, wherein the processor is configured to detect the change of the user who operates the apparatus, based on an authentication result of an authentication apparatus that authenticates a user who uses the apparatus.

12. The information processing system according to claim 1, wherein the processor is configured to determine continuous execution of a first process and a second process which is a next process of the first process, if, after completion of execution of the first process, the apparatus starts the second process within a predetermined time.

13. The information processing system according to claim 1, wherein a default value of the shift time is held in the apparatus, and wherein the processor is configured to perform the setting when a value of the shift time set in the apparatus is greater than the default value.

14. A non-transitory computer-readable storage medium storing a program for causing a computer to execute a process comprising:

for an apparatus having an executable mode and one or more types of power saving mode and setting a shift time from the executable mode to the power saving mode, the executable mode being a mode in which execution of a process is ready, detecting change of a user who operates the apparatus;

obtaining an index value based on counts of execution of processes in the respective modes in the apparatus, and setting the shift time based on the obtained index value; and in the setting, counting, as a single process, a plurality of processes in the count for the mode in which the first process of the plurality of processes is performed, the plurality of processes being performed continuously in a state in which the change is not detected.

15. A method for an apparatus having an executable mode and one or more types of power saving mode and setting a shift time from the executable mode to the power saving mode, the executable mode being a mode in which execution of a process is ready, the method comprising:

detecting change of a user who operates the apparatus;

obtaining an index value based on counts of execution of processes in the respective modes in the apparatus, and setting the shift time based on the obtained index value; and in the setting, counting, as a single process, a plurality of processes in the count for the mode in which the first process of the plurality of processes is performed, the plurality of processes being performed continuously in a state in which the change is not detected.

* * * * *